US006943459B2

(12) United States Patent
Hartman et al.

(10) Patent No.: US 6,943,459 B2
(45) Date of Patent: Sep. 13, 2005

(54) MOBILE ELECTRICAL POWER SOURCE

(75) Inventors: Albert Hartman, Palo Alto, CA (US);
Benjamin Huang, Palo Alto, CA (US);
Robert Reay, Mountain View, CA (US)

(73) Assignee: High Tide Associates, Inc., Palo Alto, CA (US)

( * ) Notice: Subject to any disclaimer, the term of this patent is extended or adjusted under 35 U.S.C. 154(b) by 0 days.

(21) Appl. No.: 10/763,709

(22) Filed: Jan. 22, 2004

(65) Prior Publication Data

US 2004/0150230 A1 Aug. 5, 2004

Related U.S. Application Data

(63) Continuation of application No. 10/226,373, filed on Aug. 21, 2002
(60) Provisional application No. 60/314,147, filed on Aug. 22, 2001.

(51) Int. Cl.⁷ ................................................ H02K 7/18
(52) U.S. Cl. ...................................... 290/1 C; 290/1 R
(58) Field of Search .................................. 290/1 C, 1 R

(56) References Cited

U.S. PATENT DOCUMENTS

| | | | |
|---|---|---|---|
| 1,131,063 A | 3/1915 | Klemmer | |
| 1,368,700 A | 2/1921 | DeVitt | |
| 3,633,106 A | 1/1972 | Wills | |
| 4,227,092 A | 10/1980 | Campagnuolo et al. | |

(Continued)

FOREIGN PATENT DOCUMENTS

| CA | 2265149 | | 5/2000 | |
|---|---|---|---|---|
| DE | 2839347 | A1 | 3/1980 | |
| DE | 3630843 | A * | 3/1988 | ........... G08C/13/00 |
| DE | 20008135 | U1 | 9/2000 | |
| GB | 2304208 | | 3/1997 | |
| GB | 2371155 | A | 7/2002 | |
| GB | 2380540 | | 4/2003 | |
| JP | 58-156235 | | 9/1983 | |
| JP | 358156235 | A * | 9/1983 | |
| JP | 1020373 | A | 1/1998 | |
| JP | 200287499 | A * | 10/2000 | |
| JP | 2000-287499 | | 10/2000 | |
| JP | 2001-136707 | | 5/2001 | |
| JP | 2003009596 | A * | 1/2003 | ............. H02P/9/04 |
| WO | WO-99/31783 | | 6/1999 | |
| WO | WO-0116525 | | 3/2001 | |
| WO | WO 01/31764 | A1 | 5/2001 | |
| WO | WO-02052692 | | 7/2002 | |

OTHER PUBLICATIONS

Full translation of JP2000–287499A Publication Date Oct. 13, 2000.*
Full translation of JP58–156235A Publication Date Sep. 17, 1983*
Fischetti, Mark. "Crank It Up!" Scientific American: Working Knowledge: Crank It Up!: Aug. 2001. Found at: http://www.sciam.com/.

(Continued)

*Primary Examiner*—Joseph Waks
(74) *Attorney, Agent, or Firm*—Steven G. Roeder

(57) ABSTRACT

A portable power source (10) includes a housing (12), a stator component (20), a rotor component (18), a crank assembly (14), and a control system (24). The stator component (20) is secured to the housing (12), the rotor component (18) rotates relative to the stator component (20) and the crank assembly (14) is coupled to the rotor component (18). The crank assembly (14) is rotated by the user relative to the housing (12). As provided herein, rotation of the crank assembly (14) by the user results in rotation of the rotor component (18) relative to the stator component (20). In one embodiment, the control system (24) controls the amount of torque required to rotate the crank assembly (14). For example, the amount of torque required to rotate the crank assembly (14) is varied according to the rotational position of the crank assembly (14).

48 Claims, 16 Drawing Sheets

U.S. PATENT DOCUMENTS

| | | | |
|---|---|---|---|
| 4,360,860 | A | 11/1982 | Johnson et al. |
| 4,555,656 | A | 11/1985 | Ryan |
| 4,701,835 | A | 10/1987 | Campagnuolo et al. |
| 4,703,188 | A | 10/1987 | Gottfried |
| 5,204,569 | A | 4/1993 | Hino et al. |
| 5,243,224 | A * | 9/1993 | Tagney, Jr. .................. 290/1 R |
| 5,252,859 | A * | 10/1993 | Tagney, Jr. .................. 290/1 R |
| 5,418,415 | A | 5/1995 | Ishizaki |
| 5,442,972 | A | 8/1995 | Hoover |
| 5,496,238 | A | 3/1996 | Taylor |
| 5,616,104 | A | 4/1997 | Mulenburg et al. |
| 5,630,155 | A | 5/1997 | Karaki et al. |
| 5,644,207 | A | 7/1997 | Lew et al. |
| 5,880,532 | A | 3/1999 | Stopher |
| 5,905,359 | A | 5/1999 | Jimena |
| 5,917,310 | A | 6/1999 | Baylis |
| 5,949,215 | A | 9/1999 | Takakura |
| 6,034,492 | A | 3/2000 | Saito et al. |
| 6,133,642 | A | 10/2000 | Hutchinson |
| 6,217,398 | B1 * | 4/2001 | Davis .......................... 440/21 |
| 6,236,118 | B1 | 5/2001 | Vasija et al. |
| 6,291,900 | B1 | 9/2001 | Tiemann et al. |
| 6,380,711 | B2 | 4/2002 | Fischer et al. |
| 6,472,846 | B1 * | 10/2002 | Hutchinson et al. ......... 320/114 |
| 6,477,116 | B1 * | 11/2002 | Shinkawa et al. ........... 368/157 |
| 6,556,867 | B1 * | 4/2003 | Kohls .......................... 607/35 |
| 2001/0047515 | A1 | 11/2001 | Schreer |
| 2004/0090210 | A1 | 5/2004 | Becker |

OTHER PUBLICATIONS

"Motorola unveils windup charger for cell phones," 2002 Associated Press. Found at: http://www.msnbc.com (Jan. 15, 2002).

Ogando, Joseph. "No charge? No Problem," Sep. 9, 2002. Design News Product Design Online. Found at: http//www.manufacturing.net/DN/index.asp?.

Hartman, A., Lorimer, W., "Cogging Torque Control in BLDC Motors", Proceedings Incremental Motion Control Systems and Devices, Jul., 2000.

Byrnee, Hugh J., "Batter Chargers and Hand Crank Generators", 21$^{st}$ Annual Proceedings Power Sources Conference, May, 1967.

Bovitz, R.S., "Development of Generator Direct Current G–63 and G–67 (Hand Cranked)", Contract DAAB07–70–C–0075, US Army Electronics Command, May, 1972.

Widiner, K.J., "Development of Generator Direct Current G–63 (Hand Cranked)", Contract DA28–043–AMC–01605(E), US Army Electronics Command, May, 1967.

*Aladdin Power Specications.* "AladdinPower Systems". Nissho Engineering Co., Ltd. Jul. 24, 2004. http://www.nseg.co.jp/english/products/aladdin/index.htm.

*Step Charger Specifications.* "Stepcharger". Nissho Engineering Co., Ltd. Jul. 24, 2004. http://www.nseg.co.jp/english/products/step/index.htm.

*NEASIA Online. Powered by Nikkei Electronics Asia.* "Cover Story: Portable Devices Become Self–Chargeable". Jul. 24, 2004. http://neasia.nikkeibp.com/nea/200308/conele_259890.html.

* cited by examiner

MOBILE ELECTRICAL POWER SOURCE

CROSS-REFERENCE TO RELATED APPLICATIONS

This application claims priority on U.S. Provisional application Ser. No. 60/314,147 filed on Aug. 22, 2001, the contents of which are incorporated herein by reference. This application also claims priority on and is a continuation of U.S. application Ser. No. 10/226,373 filed on Aug. 21, 2002, the contents of which are incorporated herein by reference.

FIELD OF THE INVENTION

The present invention relates generally to manually driven power generators.

BACKGROUND

Portable electronic devices are used for a variety of useful functions, including (i) communications devices such as mobile telephones, citizen band radios, family radio spectrum radio, and wireless internet devices, (ii) portable computing devices such as notebook computers, personal digital assistants, and calculators, (iii) military electronic devices, such as night visions devices, communications devices, precision GPS, laser targeting devices, data displays, and computing devices, and (iv) other items such as digital cameras, camcorders, global position satellite devices, portable electronic games, flashlights, radios, and audio CD/MP3 players. Further, many more such types of devices are being created all the time. In some cases, the new electronic devices have become critically important to public safety such as 911 emergency service on mobile telephones, or global position satellite devices for general aviation and marine use.

One common element in all these portable electronic devices is their need for portable electrical power. This has been traditionally solved by using assemblies of chemical batteries, either the one time use disposable batteries (such as alkaline, zinc-air), or the multiple use rechargeable batteries (such as nickel-cadmium, nickel-metal-hydride, lead-acid, lithium-ion).

Electronic devices can only be truly portable if their power sources are always available in the field. Disposable batteries have a finite capacity. One option is to carry a sufficient supply of spare disposable batteries. However, each of the electronic devices can have a different power requirement with different voltages and currents. As a result thereof, the user may be required to carry multiple different types of batteries. Further, on a long trip or mission, the user may have to carry multiple sets of backup batteries. Moreover, the used batteries create a significant waste problem because they often contain toxic chemicals such as lead or mercury. As a result thereof, in many in situations, it is not practical to carry sufficient spare batteries.

Rechargeable batteries must be near a power source to be recharged, typically, a source of 60 Hz/120V. This is generally not available in remote locations. Alternatively, dynamo style power generators have a long history of usage. However, these generators are bulky, lowpower, single voltage, single device, hard to crank, inefficient, no feedback, and/or dangerous to batteries.

In light of the above, there is the need for an efficient portable device to produce electrical energy in the field. Additionally, there is a need for a power source that can be used to generate output current and voltages to a wide range of different electronic devices with their various battery chemistries and power needs. Moreover, there is a need for a power source that is relatively easy and efficient to use and control. Further, there is a need for a power source that reduces user fatigue.

SUMMARY

The present invention is directed to power source that is powered by a user. The power source includes a housing, a stator component, a rotor component, a crank assembly, and a control system. The stator component is secured to the housing, the rotor component rotates relative to the stator component and the crank assembly is coupled to the rotor component. The crank assembly is rotated by the user relative to the housing. As provided herein, rotation of the crank assembly by the user results in rotation of the rotor component relative to the stator component.

In one embodiment, the control system controls the amount of torque required to rotate the crank assembly. For example, the amount of torque required to rotate the crank is varied according to the rotational position of the crank. More specifically, the when the crank assembly at a first rotational position the crank torque is different than when the crank assembly is at a second rotational position. In alternative embodiments, (i) when the crank assembly is at a first rotational position the crank torque is at least approximately 2 percent greater than when the crank assembly is at a second rotational position, (ii) when the crank assembly is at a first rotational position the crank torque is at least approximately 5 percent greater than when the crank assembly is at a second rotational position, (iii) when the crank assembly is at a first rotational position the crank torque is at least approximately 10 percent greater than when the crank assembly is at a second rotational position, or (iv) when the crank assembly is at a first rotational position the crank torque is at least approximately 50 percent greater than when the crank assembly is at a second rotational position. In addition, the overall drag level can be set via user control so that a weaker person can select a lighter setting than a very strong person. In this fashion, drag levels can span a typical range of 200 to 500 percent from minimum to maximum level.

As provided herein, the crank torque decreases as the angular velocity decreases and the crank torque increases as the angular velocity increases. This torque versus speed relationship can be completely specified with the electronics as described below.

The rotor component includes a plurality of poles and the stator component includes a plurality of slots. In one embodiment, the slot/pole ratio is does not have a common factor. For example, the slot/pole ratio can be approximately 15/16. Further, the slot/pole ratio is approximately equal to 1.

A radial component gap separates the rotor component from the stator component. In one embodiment, the size of the radial component gap varies. For example, the radial component gap varies at least approximately 25% between a minimum component gap and a maximum component gap.

In another embodiment, the rotor component includes transitions between the north poles and the south poles that are skewed.

The power source can be manually driven. In one embodiment, the power source enables charging of electronic devices in the field while controlling the output voltage and current and maintaining constant input torque drag.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
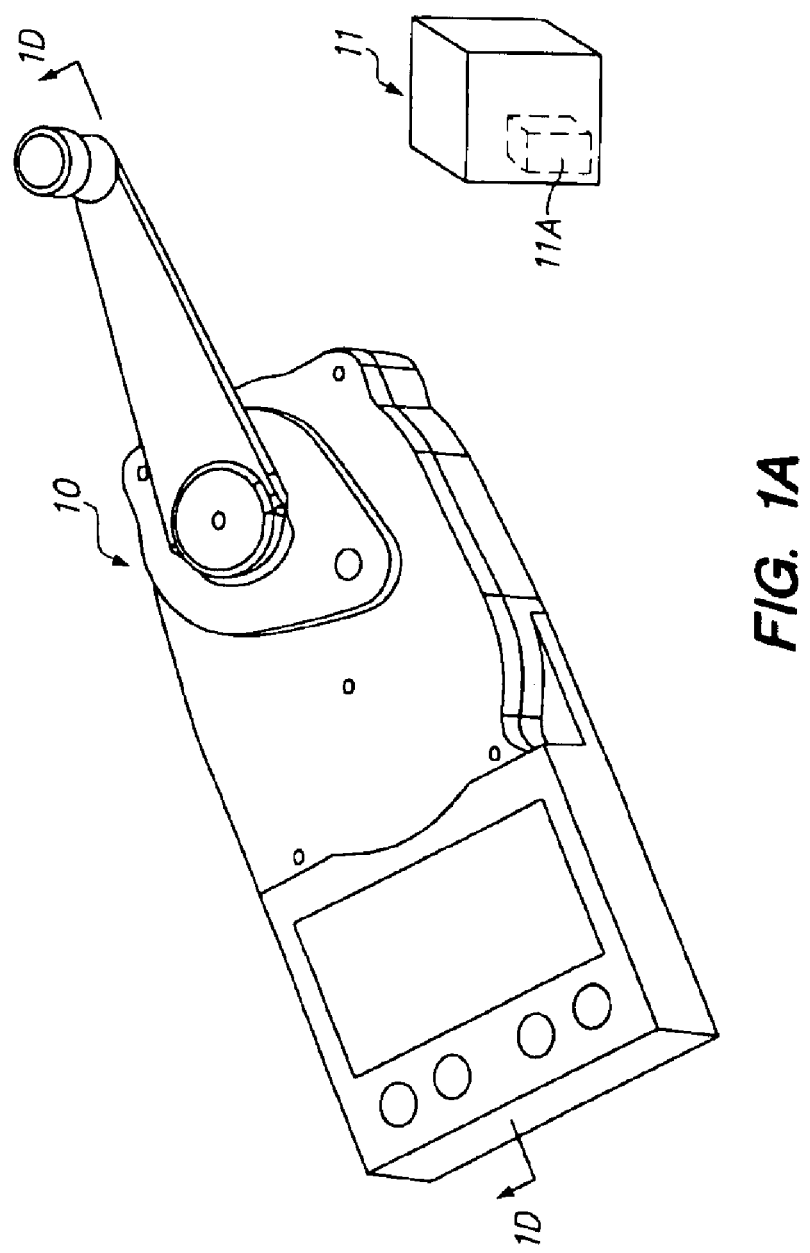
FIG. 1A is a perspective view of a first embodiment of a power source having features of the present invention and an electronic device.

FIG. 1A is a perspective view of a first embodiment of a power source 10 and an electronic device 11 that can be charged with the power source 10. The power source 10 can be used as a manually driven, mobile and portable generator. For example, the power source 10 can weigh less than approximately 0.2 pounds, 0.5 pounds, 1 pounds, 2 pounds, 3 pounds, 5 pounds, 10 pounds, or 20 pounds. Alternatively, for example, the power source 10 can be designed as a stationary generator 10.

The type of electronic device 11 charged by the power source 10 can vary. For example, the electronic device 11 can be portable and can include (i) communications devices such as mobile telephones, citizen band radios, family radio spectrum radio, and wireless internet devices, (ii) portable computing devices such as notebook computers, personal digital assistants, and calculators, (iii) military electronic devices, such as night visions devices, communications devices, precision GPS, laser targeting devices, data displays, and computing devices, and (iv) other items such as digital cameras, camcorders, global position satellite devices, portable electronic games, flashlights, radios, and audio CD/MP3 players. Alternatively, the electronic device can be stationary.

The electronic device 11 can include a battery pack 11A (illustrated in phantom) having one or more rechargeable batteries. As provided herein, the power source 10 can be used with batteries packs 11A having different charging requirements, such as different voltage requirements and/or different current requirements.

In the embodiment illustrated in FIG. 1A, the power source 10 can be operated independently of the particular electronic device 11 being charged.

Figure 1B:
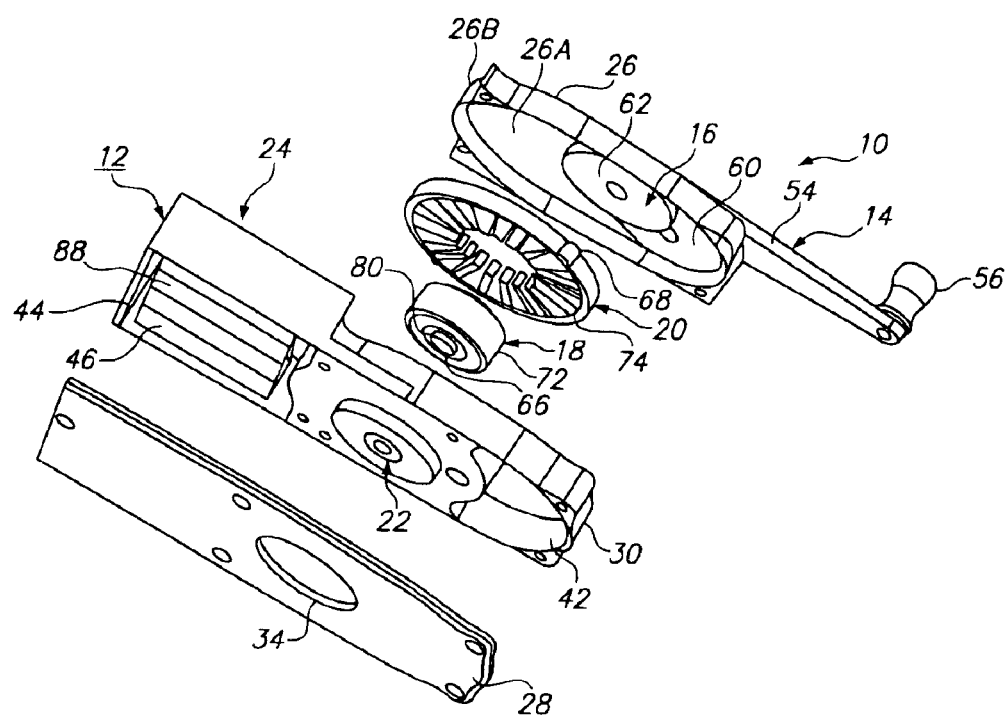
FIG. 1B is a partially exploded, first perspective view of the power source of FIG. 1A.
Figure 1C:
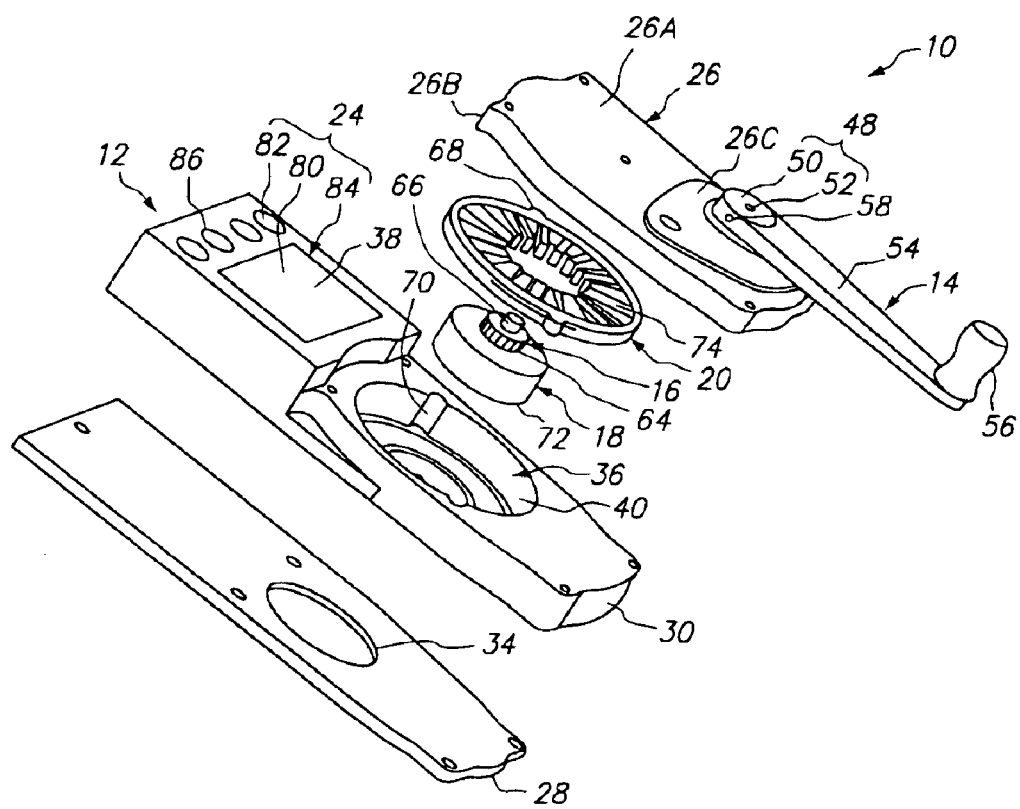
FIG. 1C is a partially exploded, second perspective view of the power source of FIG. 1B.

FIGS. 1B and 1C are partially exploded perspective views of the power source 10 of FIG. 1A. One or more of the features provided herein can be used in BLDC generators and/or SR generators. As illustrated in FIGS. 1B and 1C, the power source 10 can include (i) a housing 12, (ii) a crank assembly 14, (iii) a gear assembly 16, (iv) a rotor component 18, (v) a stator component 20, (vi) a bearing assembly 22, and (vii) a control system 24. The design of each of these components can be varied to suit the design requirements of the power source 10.

The housing 12 supports the components of the power source 10. The size and shape of the housing 12 can be varied to suit the design requirements of the power source 10. For example, the housing 12 illustrated in FIGS. 1B and 1C includes a first housing segment 26, a second housing segment 28, and a third housing segment 30. The first housing segment 26 includes a substantially planar region 26A having an outer surface and an inner surface, and a tubular region 26B that extends substantially perpendicularly away from the inner surface of the planar region 26A near a periphery of the planar region 26A. The planar region 26A further includes a raised section 26C near the end of the housing 12 away from the control system 24. The raised section 26C is stepped up away from the outer surface of the planar region 26A so that the outer surface of the raised section 26C is substantially parallel to the outer surface of the planar region 26A. The raised section 26C substantially surrounds a portion of the gear assembly 16. Near the center of the raised section 26C is a small pivot aperture (not shown) that receives a portion of the crank assembly 14. The bearing assembly 22 includes a bearing (not shown) that secures the crank assembly 14 to the housing 12 and allows the crank assembly 14 to rotate.

The second housing segment 28 is somewhat planar and rectangular shaped, and is positioned spaced apart from and substantially parallel to the first housing segment 26. The second housing segment 28 includes an aperture 34 that is substantially circular and is positioned to receive a portion of the third housing segment 30.

The third housing segment 30 includes a generator region 36 and a control region 38. The generator region 36 includes a generator cavity 40 that can be positioned at an end of the generator region 36 near the control region 38. The generator cavity 40 is sized and shaped to receive the rotor component 18, the stator component 20, and a portion of the bearing assembly 22. At an end of the generator region 36 away from the control region 38, the third housing segment 30 includes a crescent shaped cavity 42. The generator region 36 extends substantially perpendicularly between the first housing segment 26 and the second housing segment 28 near a periphery of the second housing segment 28, and is secured to the first housing segment 26 and the second housing segment 28. The generator region 36 has somewhat the same size and shape as the first housing segment 26, so that the periphery of the first housing segment 26 substantially matches the periphery of the generator region 36.

The control region 38 is substantially rectangular shaped with a cavity 44 that is sized and shaped to receive the control system 24 and a battery pack 46. The control region 38 extends substantially perpendicularly away from the second housing segment 26 and is secured to the second housing segment 28.

The first housing segment 26, the second housing segment 28 and the third housing segment 30 cooperate to substantially surround the other elements of the power source 10 exclusive of the crank assembly 14.

The first housing segment 26, the second housing segment 28 and the third housing segment 30 can be made of a suitable, rigid material. Suitable materials include aluminum, ABS plastic, and/or steel.

The crank assembly 14, when operated by a user, causes the resulting clockwise or counterclockwise rotation of the gear assembly 16. Power source 10 will work in both directions, while power source 510 shown in FIG. 5B would work best with a single direction rotation. In FIGS. 1B and 1C, the crank assembly 14 includes a pivot assembly 48 having a disc component 50 and the rod component 52, an arm 54, and a handle 56 having a handle knob and a handle pin. The disc component 50 has a substantially circular cross-section with a flat upper surface and a flat lower surface, and is positioned spaced apart from the outer surface of the raised section 26C of the first housing segment 26. The disc component 50 further includes a disc aperture that receives the rod component 52. The rod component 52 is a slender rod with a substantially circular cross-section that extends into the disc aperture and is secured to the disc component 50. The rod component 52 secures the disc component 50 to the gear assembly 16.

The arm 54, as illustrated in FIGS. 1B and 1C, has a proximal end and a distal end. The proximal end has an arced cutout that receives the disc component 50 of the pivot assembly 48. The proximal end also includes apertures near either end of the arced cutout that receive small pins 58 that extend through the apertures and into the disc component 50 to secure the arm 54 to the disc component 50. The arm 54 extends away from the pivot assembly 48 substantially parallel to and spaced apart from the outer surface of the first housing segment 26. Near the distal end, the arm 54 can also include a handle aperture that receives the handle pin and secures the handle 56 to the arm 54. Alternatively, the handle 56 can be designed without the handle pin wherein the handle knob is secured to the arm 54 with an adhesive or another type of fastener.

As noted above, the handle 56 can include the handle knob and the handle pin. The handle knob is shaped so that it can easily be gripped by the user and operator of the crank assembly 14. The handle 56 is designed so that it can easily be gripped with either the left hand or the right hand of the user for the convenience of the user. The arm 54 rotates about the pivot assembly 48 when the user applies a force to the handle 56 in a direction substantially perpendicular to the arm 54 and substantially parallel to the outer surface of the first housing segment 26. The power source 10 is designed so that the arm 54 can rotate about the pivot assembly 48 in a clockwise or a counterclockwise (when look down at the first housing segment 26) direction to generate power. The particular direction of rotation of the arm 54 about the pivot assembly 48 depends on the ease and convenience of the user.

The gear assembly 16 mechanically couples the crank assembly 14 to the rotor component 18. The gear assembly 16 can have a gear ratio of the input to output of 1:1, greater than 1:1, or less than 1:1. For example, with the design provided herein, the gear assembly 16 can have a gear ratio of between approximately 3:1 and 16:1. For example, in alternate embodiments, the gear assembly 16 can have a gear ratio of approximately 4:1, 5:1, 6:1, 7:1, 8:1, 9:1, 10:1, 11:1, 12:1, 13:1, 14:1, or up to 25:1. The power source 10 provided herein is a high energy density generator that allows for the use of a lower gear ratio, therefore resulting in lower stresses and wear on the mechanical elements such as gear teeth and bearing assembly 22. This benefit further results in lower cost and longer system life.

The rod component 52 of the crank assembly 14 extends through the raised region 26C of the first housing segment 26 and is secured to the gear assembly 16. In FIG. 1B, the gear assembly 16 includes a first gear 60, a second gear 62 and a third gear 64. The first gear 60 is secured with the rod component 52 to the disc component 50. The first gear 60 is positioned substantially parallel to and spaced apart from the inner surface of the raised section 26C of the first housing segment 26. As the user inputs a force to the handle 56 of the crank assembly 14, the arm 54 of the crank assembly 14 rotates about the pivot assembly 48. As the arm 54 rotates about the pivot assembly 48, the pivot assembly 48 and, more specifically, the rod component 52 also rotates. The rotation of the rod component 52 further causes the first gear 60 to rotate. The first gear 60 is enmeshed with the second gear 62 so that the rotation of the first gear 60 causes the second gear 62 to rotate in the opposite direction. The second gear 62 is enmeshed with the third gear 64 so that the rotation of the second gear 62, in turn, causes rotation of the third gear 64. The third gear 64 is secured to the rotor component 18. As a result thereof, rotation of the third gear 64 results in rotation of the rotor component 18.

Alternatively, the power source 10 can be designed so that the crank assembly 14 directly drives the rotor component 18. In this embodiment, the power source 10 does not include the gear assembly 16. Still alternatively, the gear assembly 16 can include more than three or less than three gears.

The rotor component 18 and the stator component 20 cooperate to convert mechanical energy from the rotation of the crank assembly 14 to electrical energy. In FIGS. 1B and 1C, the rotor component 18 is somewhat disk shaped and includes a pair of rotor pins 66 that extend along the central axis of the rotor component 18 from either end of the rotor component 18. The rotor pins 66 are spaced apart from each other, essentially forming a discontinued line along the central axis of the rotor component 18. The rotor component 18 rotates about the rotor pins 66.

The stator component 20 is substantially ring shaped and substantially encircles the rotor component 18. The stator component 20 further includes at least one bump 68 along an outer edge that fits into at least one indentation 70 along the outer edge of the generator cavity 40. As shown in FIGS. 1B and 1C, the stator component 20 can include two bumps 68 that interact and fit into two indentations 70 in the generator cavity 40 to inhibit rotation of the stator component 20. Alternatively, the stator component 20 can include more than two or less than two bumps 68, and the generator cavity 40 can include more than two or less than two indentations 70. Also alternatively, the stator component 20 can include one or more indentations 70 that coincide with one or more bumps 68 in the generator cavity. Still alternately, the stator component 20 can be secured to the housing 12 in another fashion.

In an alternative embodiment of the present invention, the positions of the rotor component 18 and the stator component 20 can be reversed so that the rotor component 18 is substantially ring shaped and substantially encircles the stator component 20.

As provided herein, one of the rotor component 18 and the stator component 20 includes a magnet array 72 having one or more magnets and the other of the stator component 20 and the rotor component 18 includes one or more turns of wire 74. The multiple turns of wire 74 can be made of copper or another electrically conductive material that is embedded in an epoxy or another type of adhesive, the purpose of which is to reduce acoustic noise and improve thermal heat dissipation.

In FIGS. 1B and 1C, the stator component 20 includes the multiple turns of wire 74, and the rotor component 18 includes the magnet array 72. Alternately, the power source 10 may be designed so that the stator component 20 includes the magnet array 72 and the rotor component 18 includes the multiple turns of wire 74.

The bearing assembly 22 supports the rotor component 18 and the gear assembly 16 relative to the housing 12 and allows the rotor component 18 and gear assembly 16 to rotate relative to the housing 12. In FIGS. 1B and 1C, the bearing assembly 22 includes multiple, spaced apart bearings 80.

The control system 24 controls charging of the electronic device 11 (illustrated in FIG. 1A). In one embodiment, the control system 24 controls the torque at the crank assembly 14 that is experienced by the user. In one embodiment, the control system 24 constantly monitors the input and output parameters of the power source 10 and provides visual feedback to the user as to the progress of the power generation process. Depending upon the embodiment, the control system 24 can perform one or more of the features of (i) adjusting the torque experienced by the user during rotation of the crank assembly 14, (ii) automatic detection of the load voltage required to charge the electronic device 11, (iii) allow for the hookup of multiple power sources 10 to charge the electronic device 11, and/or (iv) detect and configure to charge various custom battery types.

In one embodiment, the control system 24 includes a display 80, a user input 82 and a control board 84 (illustrated in phantom). The display 80 can display one or more of the functions of the power source 10. For example, the display 80 can display one or more of the features (i) the rate of charging of the electronic device 11, e.g. somewhat similar to a gas gage for a car, (ii) the estimated additional time required to charge the electronic device 11, (iii) the battery type of the electronic device 11 being charged, (iv) voltage, amps, watts being delivered to the device/battery, (v) minutes of device usage stored such as talktime on a cellphone, (vi) battery temperature, state-of-health, and/or (vii) moving graphic to help user maintain optimum cranking pace.

In one embodiment, the display 80 is a liquid crystal display. Alternatively, for example, the display 80 can include one or more gages or other type of monitors such as LEDs.

The user input 82 allows the user to communicate instructions to the control board 84 as well as to the display 80. For example, the user input 84 allows the user to specify the required charging conditions and termination conditions by specifying particular voltages, output power, etc., or by selecting among several previously defined battery types or electronic devices (ex: cellphone types). Further, the user input 82 can allow the user to adjust desired crank torque drag up or down for the convenience of the individual user.

In the embodiment illustrated in FIG. 1C, the user input 82 includes a plurality of buttons 86 that are electrically connected to the control board 84. The user can depress and/or move the buttons 86 to give instructions to the control board 84. Alternatively, for example, the user input 82 can include one or more knobs or the user input 82 can be voice activated.

The control board 84 acts as the central component of the power source 10, coordinating all monitoring, control, and status display functions. Further, the control board 84 can perform the functions of the control system 24 described above. In one embodiment, the control board 84 firstly accepts the input from the user with the user input 82 specifying the target battery charging requirements of voltage and current, and termination conditions of voltage, NDV or temperature for the electronic device 11. This feature allows the power source 10 to accommodate many different voltages, currents, etc. of the many types of battery chemistries. Additionally, commands such as desired crank drag are specified here. The functions of the control board 84 are described in more detail below.

In one embodiment, the power source 10 includes the internal battery pack 46. This allows for more rapid human energy input than many small portable devices can accept. Additionally, the internal battery pack 46 can accommodate more rapidly fluctuating voltages and currents than would be tolerated by many electronic devices 11. The power source 10 can also include a bypass circuit so that even if the internal battery pack 46 is dead, the power source 10 can still charge the electronic device 11. As provided herein, the battery pack 46 can include one or more rechargeable batteries 88, such as nickel-cadmium, nickel-metal-hydride, lead-acid, and/or lithium-ion.

Figure 1D:
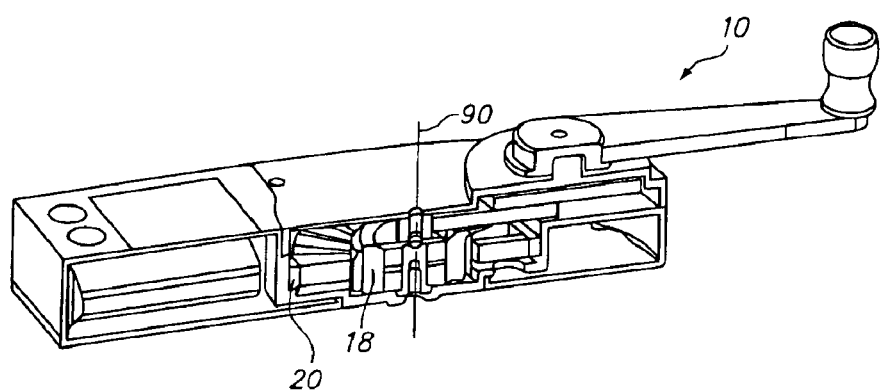
FIG. 1D is a cross-sectional view taken on line 1D—1D in FIG. 1A.

FIG. 1D is a cut-away view of the power source 10. FIG. 1D illustrates that the rotor component 18 and the stator component 20 are concentric to each other. The rotor component 18 rotates about a central axis 90 while the stator component 20 remains stationary. Equivalently, the order could be reversed with the rotor spinning external to the stator.

Figure 2A:
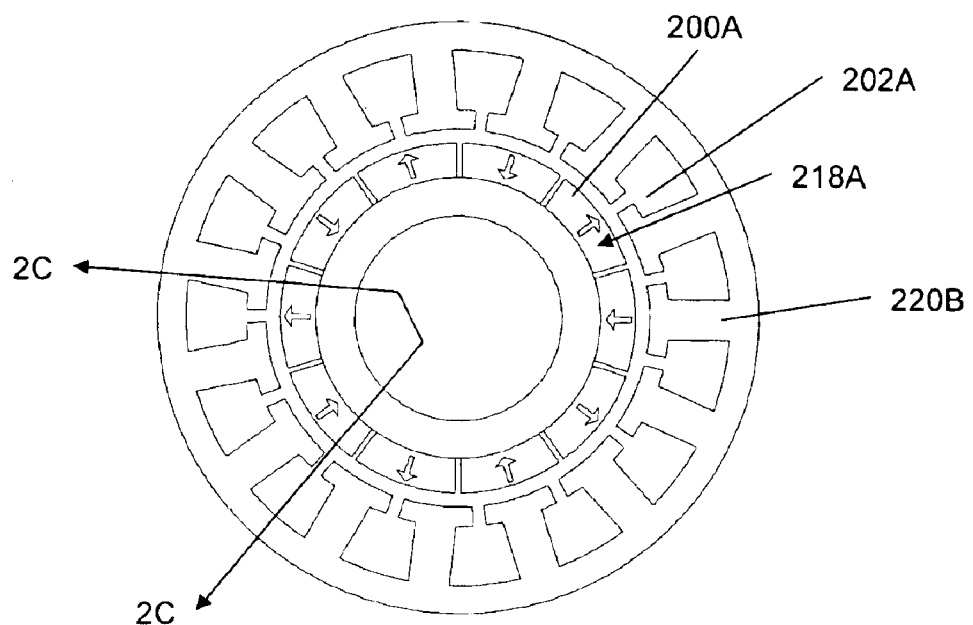
FIG. 2A is a top view of a stator component and a rotor component having features of the present invention.

FIG. 2A is a top view of a stator component 220A and a rotor component 218A that can be used in the power source 10 of FIG. 1A. In this embodiment, the rotor component 218A includes 10 poles 200A and the stator component 220A includes 15 slots 202A. Thus, the slot/pole ratio is 15/10. Stated another way, the pole/slot ratio has a common factor. For 3 phase generators, the number of slots and the number of poles having a common factor can be wound with a simple ABCABC ... pattern where A,B,C refer to the 3 winding phases, and uppercase letters refers to winding coils clockwise around each tooth shank. A lower case letter indicates winding a coil counter-clockwise around each tooth shank. Other examples of slot/pole ratios include 9 slot/12 pole, 9 slot/6 pole, and 6 slot/8 pole. These examples have the virtue of an obvious winding pattern—ABCABC . . . with all teeth wound clockwise, and each $3^{rd}$ tooth belonging to the same phase. However, common factor pole/slot ratio generators can have relatively high cogging torques.

Figure 2B:
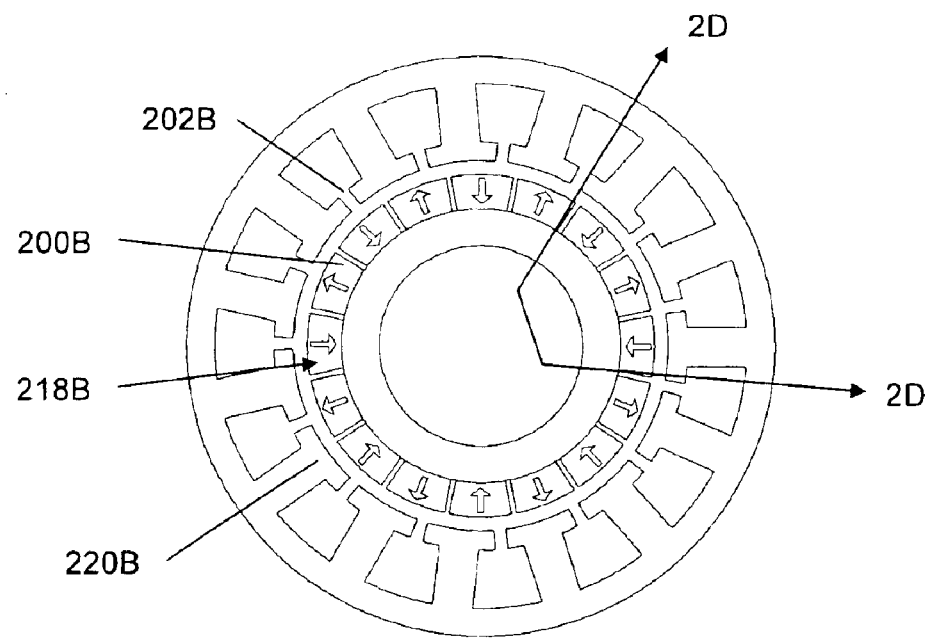
FIG. 2B is a top view of another embodiment of a stator component and a rotor component having features of the present invention.

FIG. 2B is a top view of another embodiment of the stator component 220B and the rotor component 218B that can be used in the power source 10 of FIG. 1A. In this embodiment, the rotor component 218B includes 16 poles 200B and the stator component 220B includes 15 slots 202B. Thus, the slot/pole ratio is 15/16. Further, the least common multiple of this design is 240. Stated another way, the pole/slot ratio does not have a common factor that evenly divides into the number of poles or slots and the power source has a fractional pole/slot ratio. In this embodiment, the winding pattern can be AaAaABbBbBCcCcC where the uppercase letters refers to winding coils clockwise around each tooth shank and the lower case letters indicate winding a coil counter-clockwise.

Alternatively, the stator component 220B and the rotor component 218B can be designed with fractional pole slot ratios, such as 15 slot/14 pole, 9 slot/8 pole, 9 slot/10 pole, 21 slot/18 pole, or 21 slot/20 pole. These examples have a least common multiple of 210, 72, 90, 378, or 420 respectively.

The fractional pole/slot ratio designs can have a smaller cogging torques than common factor pole/slot ratio designs. Additionally, the lack of a common factor and a relatively high least common multiple reduces the magnitude and increases the frequency of the cogging cycles. This results in very smooth motion and rotation of the crank assembly.

Further, the stator component 220B and the rotor component 218B illustrated in FIG. 2B have a pole/slot ratio that is very close to 1. Higher strength generators occur when the pole/slot ratios are closest to 1, because this maximizes rotor/stator magnetic coupling. Examples of suitable alternative pole/slot ratios have a value of approximately 0.7; 0.8; 0.9; 1; 1.1; 1.2; and 1.3.

As provided herein, high vibration and low generator strength can be avoided by using pole/slot ratios with no common factors, and having pole/slot ratios close to 1. Further, these features can inhibit "cogging", e.g. relatively large uncomfortable torque vibrations to the user when cranking that can also cause high acoustic noise.

Figure 2C:
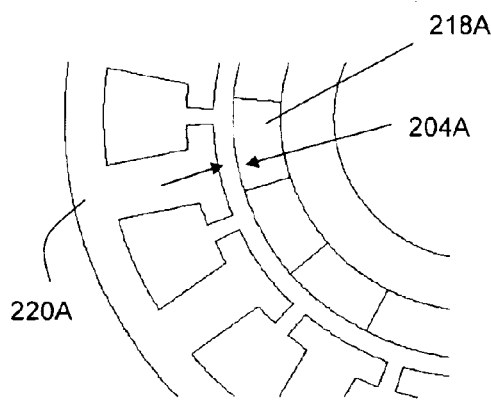
FIG. 2C is a cut-away view taken on line 2C—2C in FIG. 2A.

FIG. 2C is a cut-away view of the stator component 220A and the rotor component 218A of FIG. 2A. FIG. 2C illustrates that the outer circumference of the rotor component 218A is spaced apart from the inner perimeter of the stator component 220A by a radial component gap 204A that is filled with air. In this embodiment, the radial component gap 204A is substantially constant.

Figure 2D:
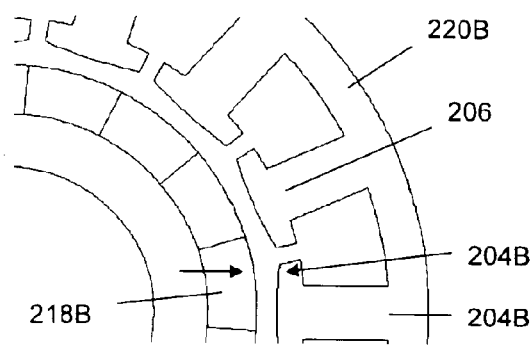
FIG. 2D is a cut-away view taken on line 2D—2D in FIG. 2B.

FIG. 2D is a cut-away view of the stator component 220B and the rotor component 218B of FIG. 2B. FIG. 2D illustrates that the outer circumference of the rotor component 218B is spaced apart from the inner perimeter of the stator component 220B by a radial component gap 204B that is filled with air. In this embodiment, the component gap 204B varies around the circumference of the rotor component 218B. For example, in this embodiment, the profile of the tooth head 206 of the stator component 220B adjacent to the rotor component 218B is such that the radial component gap 204B is smallest at the center of each tooth 206 and widest near the edges of each tooth.

As an example, the component gap 204B can vary approximately 5%, 10%, 20%, 30%, or 50%. Stated another way, in alternative embodiments, the radial component gap 204B can have (i) a minimum component gap at the tooth center of approximately 0.2 mm and a maximum component gap at the tooth edges of approximately 0.35; (ii) a minimum component gap at the tooth center of approximately 0.5 mm and a maximum component gap at the tooth edges of approximately 0.8 mm; (iii) a minimum component gap at the tooth center of approximately 0.15 mm and a maximum component gap at the tooth edges of approximately 0.25 mm; or (iv) a minimum component gap at the tooth center of approximately 1.0 mm and a maximum component gap at the tooth edges of approximately 1.5 mm.

In this embodiment, the distal end of each tooth forms a somewhat curved, e.g. convex surface.

As provided herein, by varying the airgap between the rotor component 218B and stator component 220B, the amount of cogging experienced by the user for a particular rotor and stator design is reduced.

An additional design feature available for both BLDC generators and SR generators is to include a stator airgap to be both radial and axial. This can be accomplished with partially interdigitated lam and rotor component iron throughout the z-height, or only on the top and bottom ends In another embodiment, the stator component and the rotor component can create higher frequency magnetic fluctuation by notching. This causes faster cycle speeds that result in higher generated energy. In some cases, this may allow the gear assembly to be eliminated entirely independent of whether a BLDC generator or a SR generator is being used.

Figure 2E:
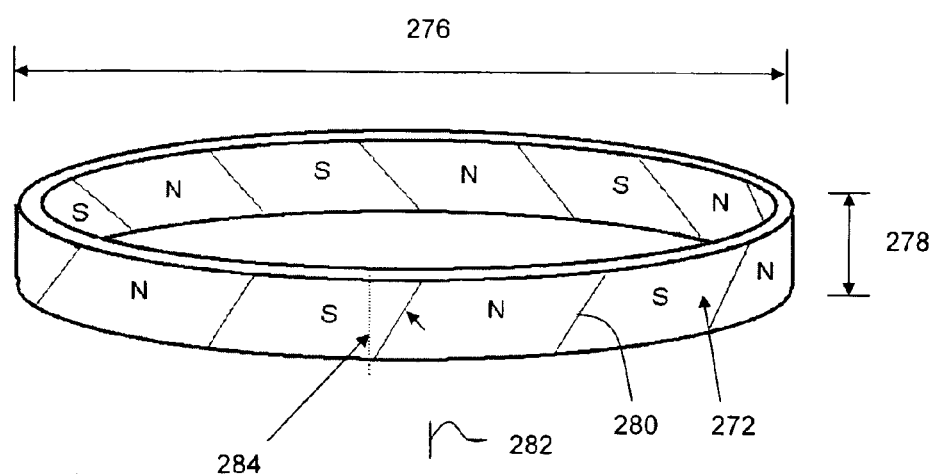
FIG. 2E is a perspective view of one embodiment of a magnet array having features of the present invention.

FIG. 2E is a perspective view of one embodiment of a magnet array 272 that can be used in the rotor component. In this embodiment, the magnet array 272 includes a single multiply magnetized permanent magnet constructed to form alternating north and south poles. The magnet array 272 can use high energy sintered NdBFe with strengths of between approximately 40–50 MGOe. Alternatively, the magnet array 272 can have strengths of between approximately 30–60 MGOe, 30–50 MGOe, or 40–60 MGOe. This very strong magnet material allows the power source 10 to be very compact in size, but requires special features to accomplish maximum electrical output in minimum physical volume.

In FIG. 2E, the single-piece cylindrical magnet ring magnet array 272 is magnetized so that the transition 280 between adjacent north poles (N) and south poles (S) is skewed. Stated another way, the magnet array 272 is centered about a magnet axis 282 and the transition 280 is at an angle 284 relative to the magnet axis 282. For example, the angle can at least approximately 5, 10, 15, 20, 25, 30, 35, 40, 45, 50, 55, or 60 degrees.

In an alternate embodiment, the magnet array can include multiple discrete magnets that are secured together into an annular shaped ring.

Additionally, the magnet array 272 can have unique dimensions where the outside diameter 276 is much larger than the height 278 of the magnet array 272. In alternative embodiments, the magnet array 22 has a ratio of outside diameter 276 to height 278 of at least approximately 2.5:1, 3:1, 4:1 or 5:1.

With the internal rotor component 18, this relationship can accommodate shaft bearings whose z-height is below the lam stack height. This is in contrast to generators that are typically 2:1 with shaft bearings above and below the stator lams reducing this ratio to 1:1 or less.

Referring back to FIG. 2B, rotation of the rotor component 218B causes the magnetic fields created by the magnet poles of the rotor component 218B to pass through the multiple turns of wire of the stator component 220B. The passage of the wire through the magnetic field created by the magnet poles of the magnet array 272 causes a fluctuating magnetic flux to pass through the stator component 218B, which induces fluctuating voltages in the multiple turns of stator wire according to Faraday's Law. The magnitude of and frequency of the induced phases' fluctuating voltages depends on the strength of the flux and frequency of passage through the magnet poles. Higher pole strengths and faster passage of the multiple turns of wire through the alternating north and south poles produces proportionally higher generated voltages and higher possible electrical energy production.

For a generator the efficiency (η) of governed by the following formulas:

$$\eta = \frac{Z}{1+Z}$$

$$P = Km^2 G^2 W^2 \frac{Z}{(1+Z)^2}$$

Where P is power out [watt], Z is load/generator impedance ratio, W is handle speed [rad/s], G is the gear ratio, and Km is the motor constant

[V-S/√Ω]

Figure 3A:
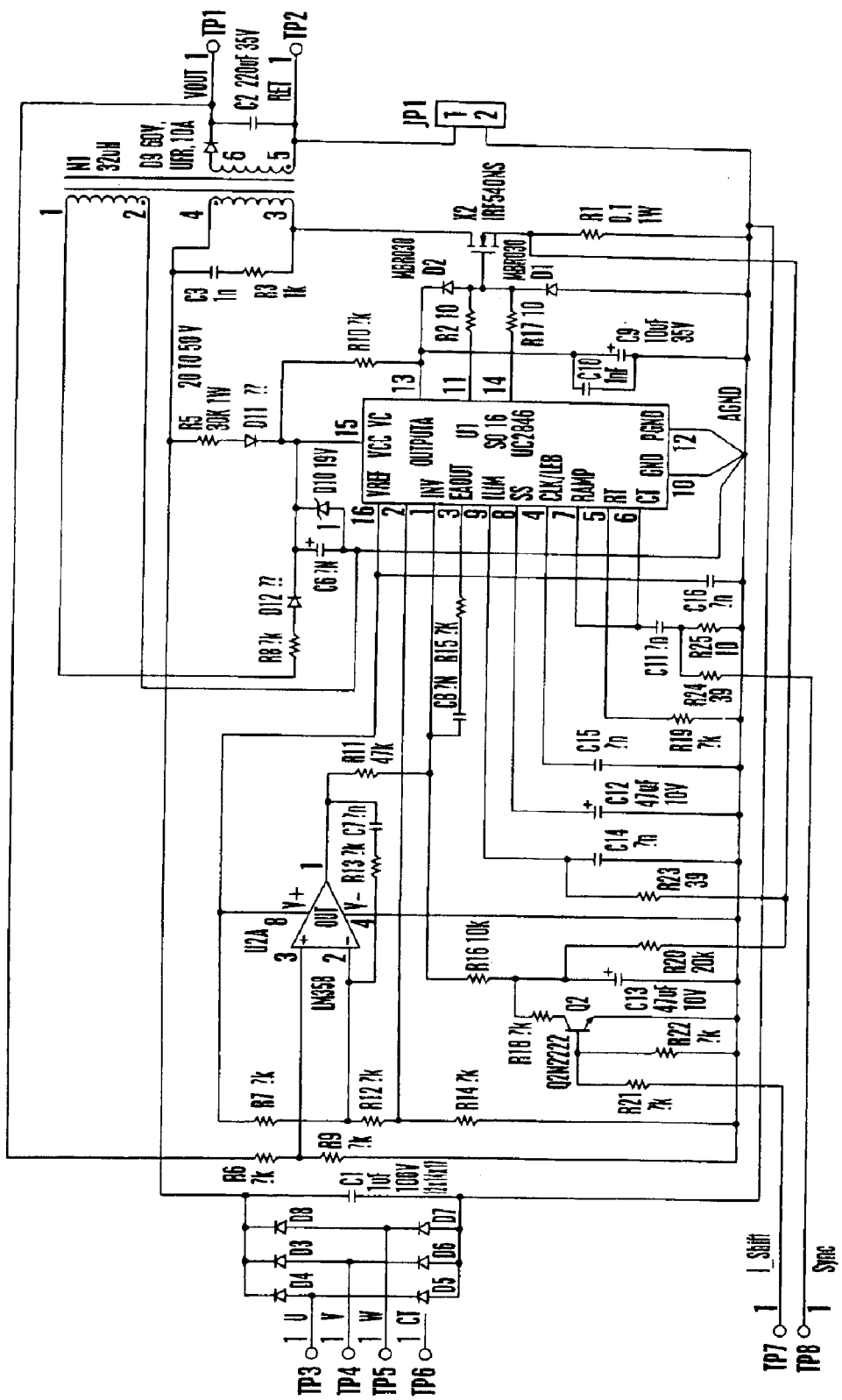
FIG. 3A is a block diagram of a flyback converter having features of the present invention.
Figure 3B:
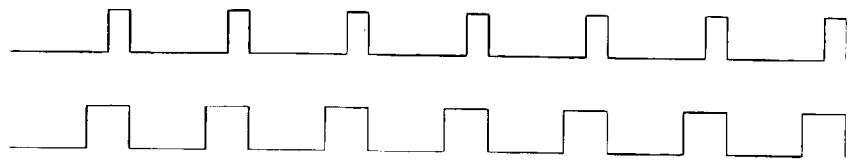
FIG. 3B is a block diagram of a switching converter having features of the present invention.
Figure 3F:
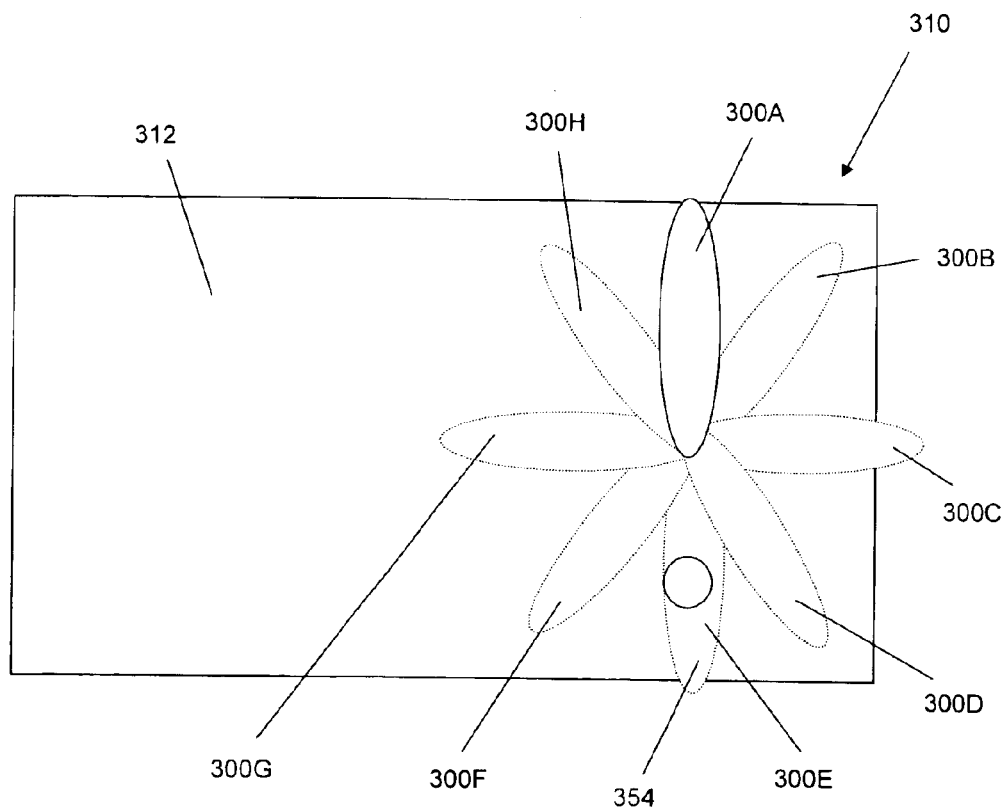
FIG. 3F is a simplified illustration of a power source having features of the present invention.
Figure 3C:
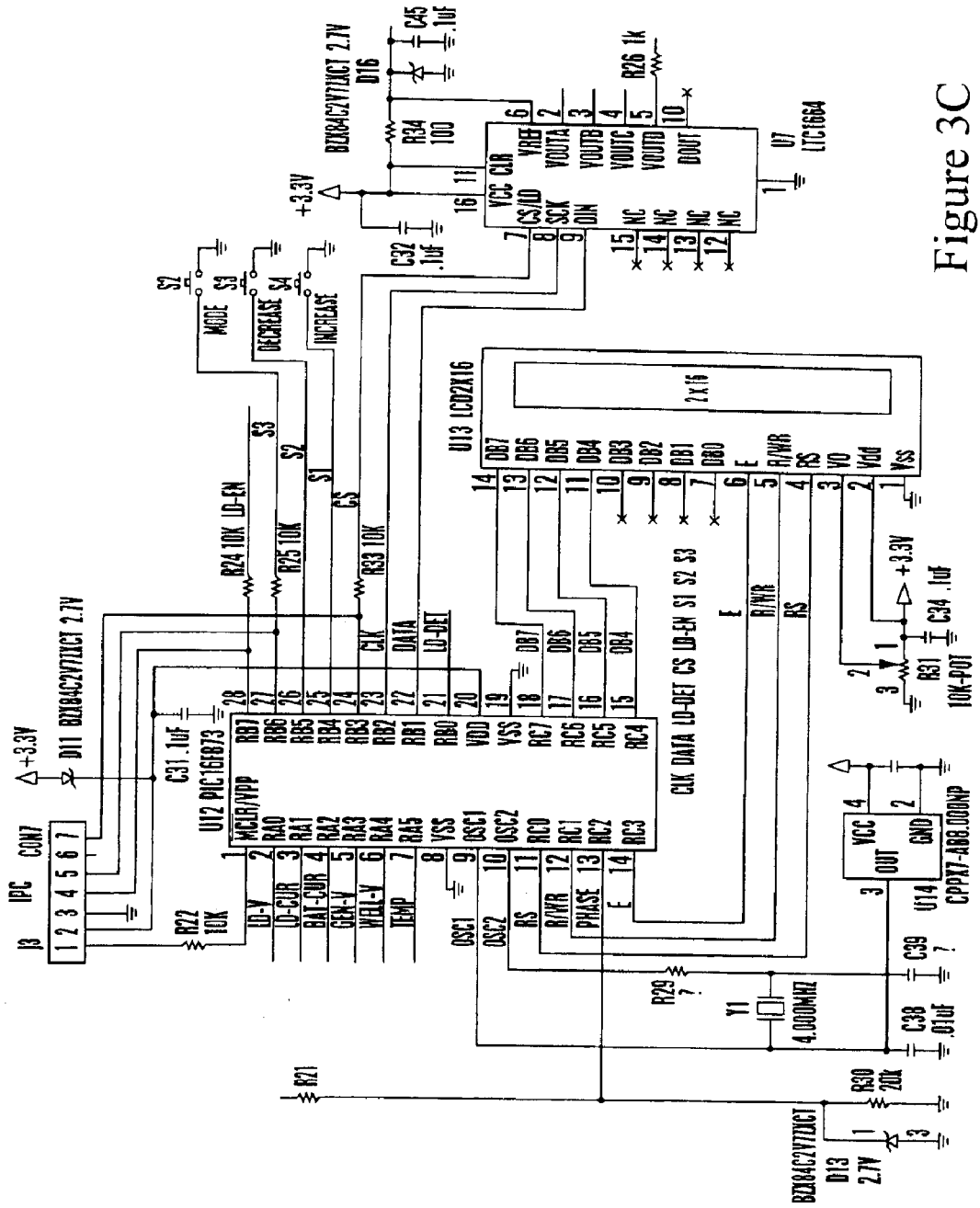
FIG. 3C is a block diagram of a microprocessor controller having features of the present invention.
Figure 3D:
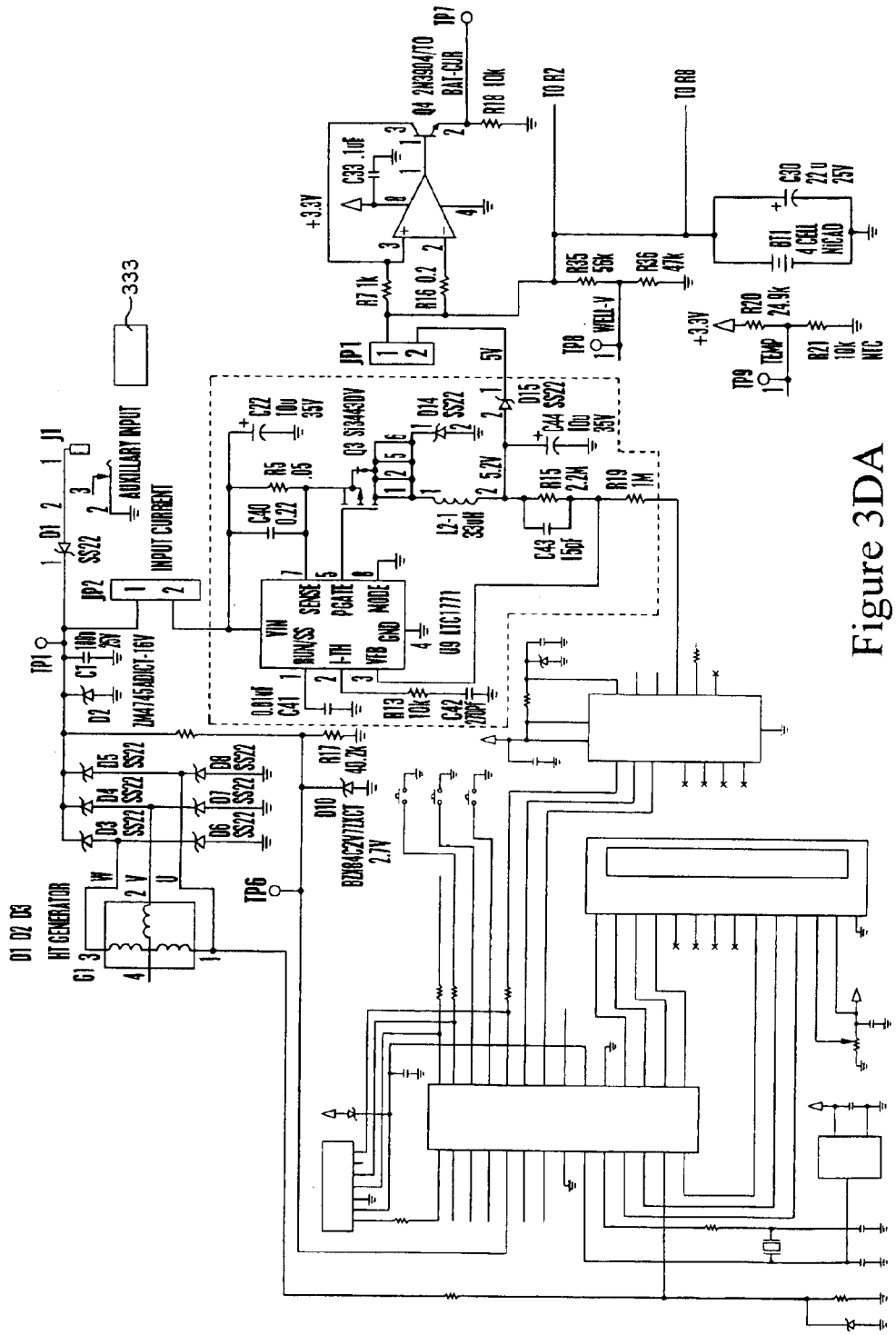
FIG. 3D is a buck stage followed by a SEPIC stage and microprocessor having features of the present invention.
Figure 3D:
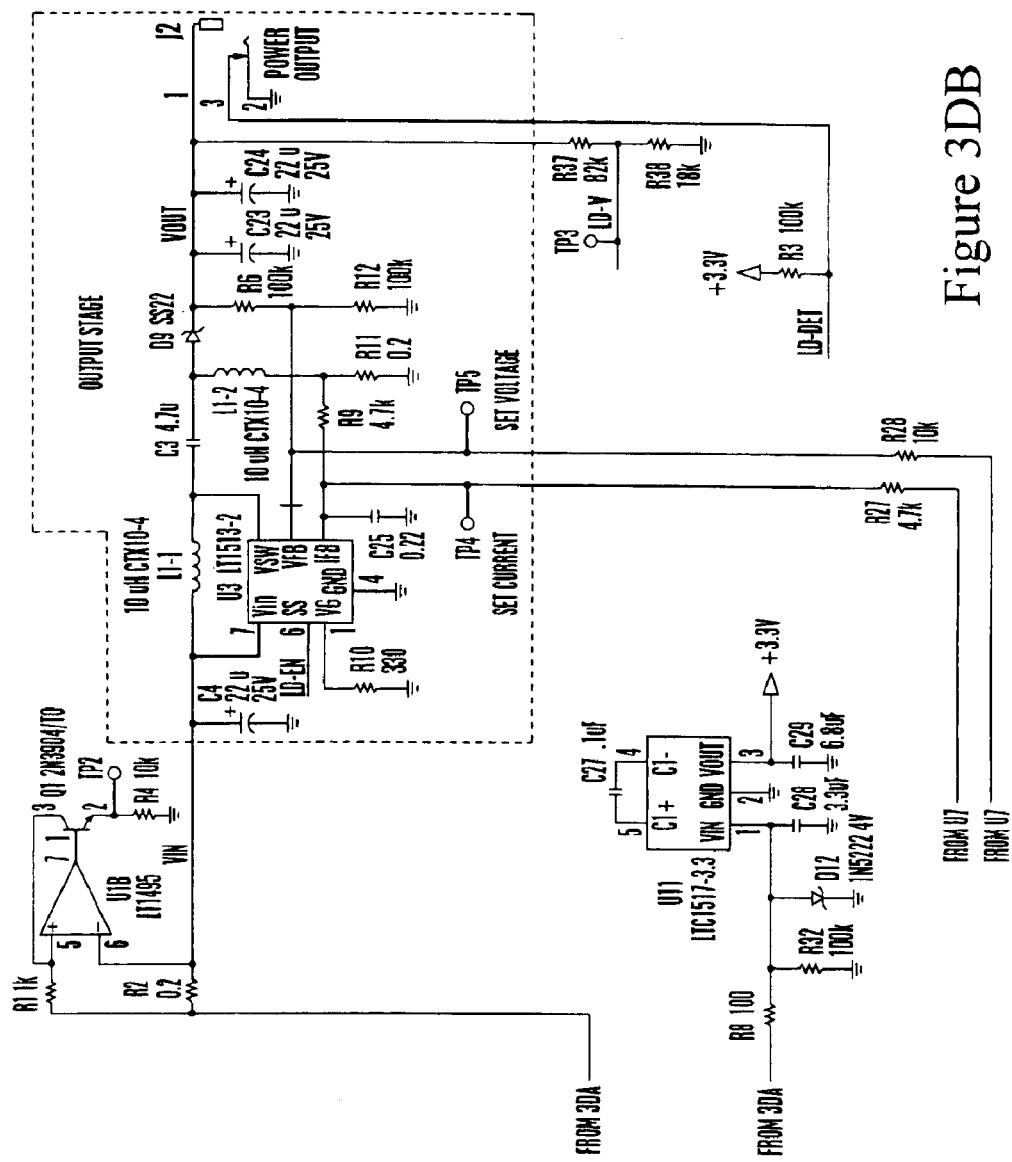
Figure 3E:
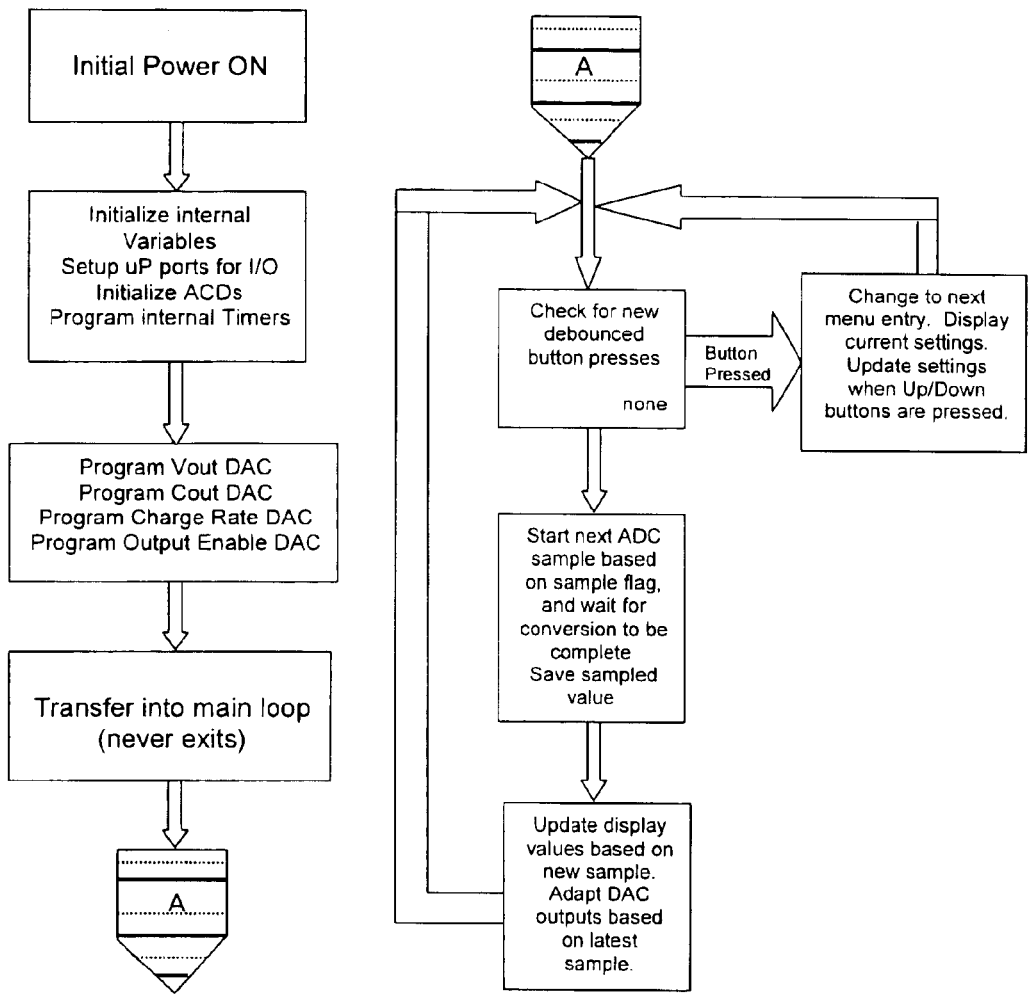
FIG. 3E is a firmware flowchart having features of the present invention.
Figure 3G:
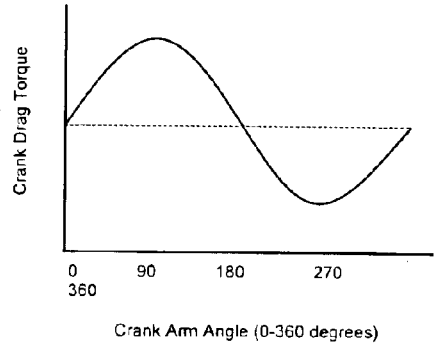
FIG. 3G is a graph that illustrates drag torque versus arm angle for another embodiment of the power source at a constant RPM.
Figure 3H:
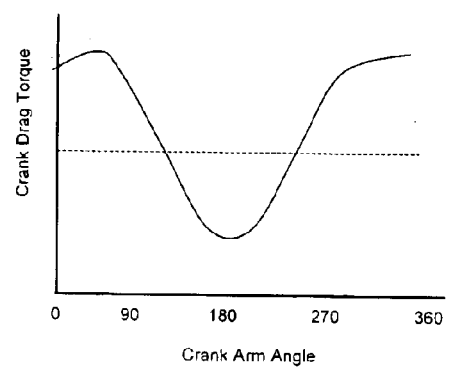
FIG. 3H is a graph that illustrates drag torque versus arm angle for one embodiment of the power source.
Figure 3I:
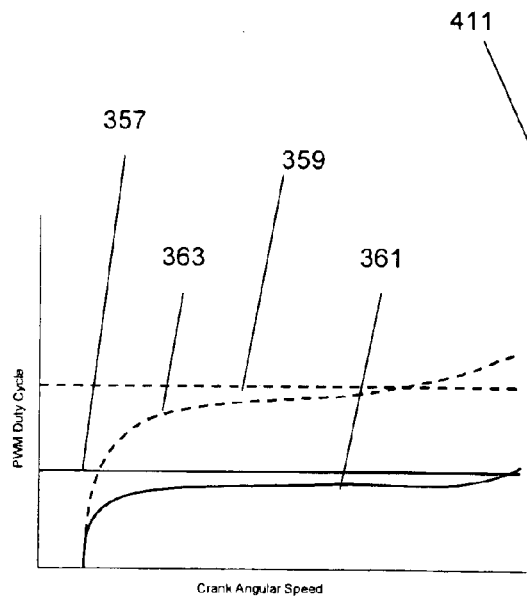
FIG. 3I is a graph that illustrates a variety of possible duty cycle versus rotor/crank arm speed curves.

FIG. 3I illustrates a variety of possible duty cycle versus rotor/crank arm speed curves. In one embodiment, a constant duty cycle could be implemented. This is illustrated as straight line 357 in FIG. 3I. With a single-stage flyback converter, this would result in a crank torque that gets harder as the crank arm is turned faster. The user could select a different similar duty cycle curve. This is illustrated as straight line 359 in FIG. 3I. In this case, a similar profile of the crank torque which gets harder at higher speeds would be obtained. But the overall levels at all speeds would be harder. This is similar to selecting a higher bicycle gear ratio. The curved profile 361 of FIG. 3I illustrate that any shape curve can be implemented offering better ergonomics than a single constant duty cycle. In a similar fashion, another similar curve 363 could be user-selected offering a higher overall level of effort. It is to be understood that more than just 2 curves per family could be easily implemented and selected by the user.

The present invention utilizes a relatively low gear ratio (G) and a relatively high motor constant (Km). As provided herein, the power source 10 has a motor constant (Km) of at least approximately 50e-3, 70e-3, 100e-3, or 200e-3 [V-S/sqrt(ohm)].

In one embodiment, the control board 84 (illustrated in FIG. 1C) includes a first relay, a second relay, a third relay, a fourth relay, a plurality of sensors, a first converter and a second converter.

In one embodiment, the first converter rectifies the AC phase voltages to a positive voltage, e.g. DC. This can be accomplished through use of a simple diode bridge used for BLDCMs, or an actively driven and switched transistor array used for SRMs. The fluctuating, rectified voltage is a direct and unavoidable result of the varying crank speed produced by the user. While the human input energy produces fluctuating voltage, the target batteries to be charged typically require precise constant voltage.

In one embodiment, the second converter is a switching DC-to-DC converter that can convert an input DC voltage to an output DC voltage by varying the duty cycle of a pulse train (a pulse width modulator or PWM). The second converter helps enable the generator to directly charge the electronic device at any required voltage or current levels.

One example of a suitable second converter is a Buck-Boost-type converter that can be used to produce output voltage equal to negative D/(1−D) times the input voltage. D is the duty cycle of the PWM switch, which would be 0.25 if the switch were on for ¼ the time and off for ¾ of the time. This feature can be taken advantage of so that if the human input voltage varies, the duty cycle D of the PWM can be varied and still produce any constant or varying output voltage above or below the input voltage that is desired to drive the target battery load voltage.

A non-dual stage analog convertor is also possible. FIG. 3A illustrates an example of a single stage flyback convertor. It displays several useful properties as already discussed. It converts voltage according to nD/(1−D), where n is the transformer turns ratio. It is capable of delivering power to a load that may be above or below the input generator voltage. When driven with a constant duty cycle PWM waveform as in FIG. 3B, it has the desirable characteristics that more current will be driven if the crank assembly is turned faster, and less current will be driven as the crank assembly is turned slower. This means that faster cranking will increase the torque, while slower cranking will reduce it, just as desired for comfort. With this design, even at slow cranking speeds, the battery will still be charging and directly driving into a battery. This contrasts with simple diode bridge rectifiers which only charge loads when the input crank speeds are high enough to generate a voltage above the battery load voltage. The PWM wave form illustrated in FIG. 3B is at constant frequency, but need not be.

In an alternative embodiment, a full-wave rectification technique is utilized. With this design, charging stops when the power source is turned too slowly to produce voltage higher than the battery stack.

Additionally, the effort required at any crank assembly rotational speed can be increased by changing the duty cycle to the convertor as illustrated in FIG. 3B. At a higher duty cycle, the torque will increase or decrease according to crank assembly speed, as before. But the overall levels will be higher than before. This enables torque control somewhat similar to changing gears on a bicycle. Furthermore, fine tuning the PWM duty cycle as the crank assembly is turned through its 360 degrees can give higher drag during strong parts of the stroke, and lower drag during weaker parts of the stroke.

Varying PWM duty cycles can be produced by a microprocessor arrangement as illustrated in FIG. 3C. The RPM of the power source and crank handle as well as its position can be read for example by sampling the voltage at a single generator phase as shown. And appropriate output voltage levels can be sent to oscillators to generate PWM signals and enable/reset convertor chips as shown. Additionally, reading user input and driving displays is also readily implemented as shown. It should be noted that the microprocessor arrangement illustrated in FIG. 3C functions as a first regulator that changes the PWM duty cycle and regulates and controls the output energy to the external battery or device that is being charged. The microprocessor itself requires a different power level to operate, as does other components such as the LCD display U13. A second regulator U11 (illustrated in FIG. 3DB) diverts a portion of the main electrical energy and regulates this internally required energy to the microprocessor.

FIG. 3D illustrates a dual stage convertor with microprocessor control. The first stage is a buck stage that reduces the input generator voltage to a controlled lower value to charge a super cap or internal battery well. The power is then passed to a SEPIC switching convertor than drives loads above or below the intermediate stage voltage. It has similar capabilities of altering the crank drag torque when driven by different duty cycles as seen in FIG. 3C.

FIG. 3E is a firmware flowchart that details the operation of the circuit board. As cranking is initiated and voltage is produced, the microprocessor comes alive and executes a sequence of steps to initialize itself and reset the various convertor circuit chips. A polling loop is then entered into which monitors crank rpm, position, and monitors load voltage and current, and looks for any user button presses. The procedure computes and stores progress such as energy delivered so far, battery conditions such as temperature, etc. as earlier described. It also drives the display for all user information.

Additionally, human input torque capability is typically a function of the hand and arm position and direction of applied force, hence of crank angular position. In one embodiment, the control system adjusts the crank torque as a function of crank angle so that the drag is higher at the stronger arm positions and lower at the weaker arm positions as the crank is rotated through 360 degrees. Essentially any profile of crank torque versus rpm or angle can be readily implemented using this approach.

FIG. 3F is a simplified illustration of a power source 310 with the housing 312 and the arm 354 of the crank assembly 314 at eight different rotational positions. In FIG. 3F, the arm 354 in (i) the first position 300A is at approximately 0 degrees, (ii) the second 300B is at approximately 45 degrees, (iii) the third position 300C is at approximately 90 degrees, (vi) the fourth position 300D is at approximately 135 degrees, (v) the fifth position 300E is at approximately 180 degrees, (vi) the sixth position 300F is at approximately 225 degrees, (vii) in the seventh position 300G is at approximately 270 degrees, and (viii) the eighth position 300H is at approximately 315 degrees. It should be noted that the illustrations of the positions 300A–300H are for convenience of the reader and can be varied.

In one embodiment, for example, (i) the torque experienced by the user can be less at the first position 300A than the second position 300B, (ii) the torque experienced by the user can be less at the second position 300B than the third position 300C, (iii) the torque experienced by the user can be more at the third position 300C than the fourth position 300D, (iv) the torque experienced by the user can be more at the fourth position 300D than the fifth position 300F, (v) the torque experienced by the user can be more at the fifth position 300F than the sixth position 300G, (vi) the torque experienced by the user can be more at the sixth position 300F than the seventh position 300G, and (vii) the torque experienced by the user can be more at the eighth position 300H than the seventh position 300G. In this example, the torque varies as a function of position. At higher or lower speeds, the same behavior can be implemented at a corresponding higher or lower torque level.

FIG. 3G is a graph that illustrates crank torque versus the arm rotational position for a substantially constant rotational speed. FIG. 3G illustrates that the torque experienced by the user varies according to the rotational position of the arm.

FIG. 3H is an alternate graph that illustrates crank torque versus the arm rotational position for a substantially constant rotational speed for a different design. FIG. 3H also illustrates that the torque experienced by the user varies according to the rotational position of the arm.

For a substantially constant rotational speed, the difference between the maximum crank torque experienced by the user at one rotational position and the minimum crank torque experience by the user at another rotational position can vary. For example for a substantially constant rotational speed, in alternative embodiments, the maximum crank torque can be at least approximately 2, 5, 10, 15, 20, 25, 30, 35, 40, 45, 50, 55, 60, 65, 70, 80, 90, 100, 125, 150, 175, 200, 250, 300, 350, 400, or 500 percent greater than the minimum crank torque experience by the user.

For alternative example embodiments, a substantially constant rotational speed is within 5%, 10% or 20%.

Actively controlling the crank torque drag, as discussed above, can be a highly desirable feature of the power source. For example, as the user is slowing down, the torque required to rotate the crank assembly is reduced. With this design, as rotational velocity decreases, crank torque is decrease. This can be desired because the user probably is slowing down because he/she is fatigued. Similarly, as cranking speed is increased, the crank torque required to rotate the crank assembly is raised. In this case, the user is probably speeding up since he/she is feeling strong. This is superior to the typical commercially available power circuitry which maintain a constant wattage output. In this undesirable, but typical case, as the user slows down, the drag increases.

The relationship between the rotational velocity and the crank torque can be varied to suit the design requirements of the power system. For example, in one embodiment a change of rotational velocity of approximately 5% results in a change in crank torque of approximately 1%. Alternatively, (i) a change of rotational velocity of approximately 10% results in a change in crank torque of approximately 10%; a change of rotational velocity of approximately 15% results in a change in crank torque of approximately 20%; and a change of rotational velocity of approximately 20% results in a change in crank torque of approximately 50%.

Additionally, the user input 82 can allow the user to input desired crank torque drag for the convenience of the individual user. With this design, power source 10 allows the user to maintain user comfort by allowing the user to set the cranking drag higher or lower for any speed at which they wish to operate. The battery charge rate is actively controlled so that the crank torque to the user is maintained as specified irrespective of cranking speed. Stated another way, the charge rate is actively controlled to set a comfortable torque for rotating the crank assembly 14. Different people have different desires for cranking torques and speeds. This feature can be implemented via microprocessor code in table lookup or formula fashion.

In an alternative embodiment, the power source is set to deliver a constant battery current charging rate (constant power). This is easy to implement, but results in crank drag that varies according to speed. If the crank speed is lowered, the crank drag torque is increased to make the charging power rate constant (power=torque×speed). Similarly, as cranking speed is increased, the crank torque is lowered to again make the charging power rate constant.

In one embodiment, the control board must have power to begin operation, although the required power is very low. The circuits on the control board have features that can produce sufficient voltage to charge a cap or supercap from a power off state with only human cranking and no cpu help. This is a unique power up feature. This can naturally be done with diode rectifiers for BLDC generators. For SR generators, a small magnet near the plurality of teeth of the rotor component producing modulating e-m fields and a single coil driving a diode bridge can serve provide this unique power up feature.

When the user input includes a certain power level, the control board uses control loops to bring the system from power off to a known good state by slowly ramping up to the power requested by the user. This avoids trying to produce impossible output levels. In the case where a lower output level can be accomplished with two distinct crank torques at some fixed crank speed, the control board ensures that the lower, more efficient crank torque is always chosen.

Many of the features of the present invention are implemented by suitable algorithms that are executed by the control board. For example, all voltages, currents, temperature, time, crank position and velocity are monitored by the software routines.

In one embodiment, the control system automatically determines the presence and power requirements of an unknown load attached to the power source. For example, the flow source slowly ramps up the voltage until it sees current flowing. The control board can then examine the voltage at this point and choose a suitable safe default charging rate for the device.

The control system receives the newly processed information from the user input and transfers that information to power circuitry as data, and analog level, or PWM pulse train, ultimately to set the switching waveform of the power convertors through the second relay so that the output can be controlled to achieve the desired output power, etc.

During the operation of the power source 10, the control system monitors the output voltage and the current that are actually being generated. A third relay transfers this information back to the control board.

The control board then transfers all input and output information to the display through the fourth relay, so the user can monitor the progress of the generation process. The display can provide status of various input and output levels such as charging rate, charging efficiency, joules delivered (gas gauge), output voltage, temperature, etc. It can use engineering units such as amps, coulombs, joules, volts, or user units such as cellphone talk time, hours of game play, percent full, charging efficiency, etc. Additionally, moving graphic displays can be employed to guide and pace users to the most ideal speeds and offer motivational tools such as progress bars and other animations to reduce the boredom during longer charging operations.

Moreover, the control system can test for and display fault conditions, such as damaged batteries in the electronic device 11 (illustrated in FIG. 1A).

The plurality of sensors can be included to ensure that the power source is producing power as required to charge whatever mechanical device, through the battery pack, needs to be charged at that time. The plurality of sensors can be arranged so that some of the plurality of sensors are provided on the output load side and some of the plurality of sensors are provided on the input generator side.

The output voltage, current, and temperature are measured at the output side, or battery side. These are useful for monitoring battery-charging conditions in order to keep voltages at proper levels and to avoid overcharge. Different battery chemistries have different charging voltage requirements and charge termination conditions. Tracking current and voltage allows for safe charging and accurate determination of fully charged state by known methods such as a specified end of charge voltage, or negative $\Delta V$ when the voltage drops off by a specific amount near full charge. Additionally, termination based on high cell voltage temperature being reached is also implemented via the temperature sensor.

There are also voltage and current sensors on the input side, the generator side, that are used by the control board for proper commutation of the coil phases. The crank torque (or drag) can be directly measured with a torque sensor such as a strain gauge or alternatively inferred by voltage and current measurements on the battery terminals or the generator stator coil phases. One example method is that in a BLDCM generator, the coil current is proportional to crank torque (by constant Kt). The crank angle and rotation rate can also be measured by an angular sensor such as 3 Hall devices or more simply by counting phase voltage cycles as the poles pass by. This information is used for maintaining the crank torque as specified by the user and also as a function of crank position.

Figure 4:
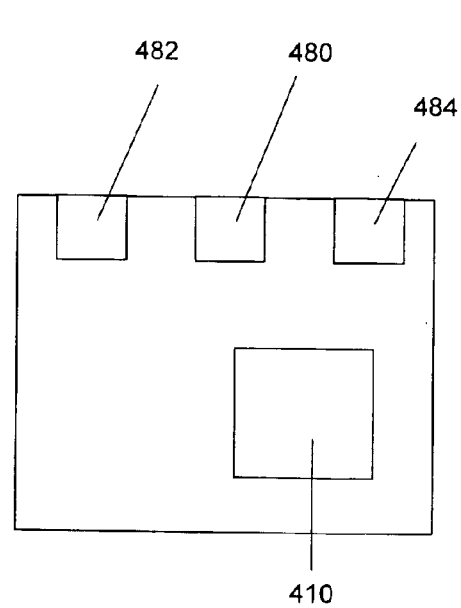
FIG. 4 is a perspective view of another embodiment of a power source having features of the present invention.

FIG. 4 illustrates a perspective view of another embodiment of the power source 410. In this embodiment, the power source 410 (Illustrated as a box) is embedded within an existing mobile electronic device 411 (illustrated as a box). In this embodiment, some of the components of the power source 10 described above are may not be necessary in the power source 410. For example, the user input 82, the display 80 and the control board 84 as described above can be integrated into the user input 482, display 480, and the control board 484 of the electronic device 411.

As examples, the combined electronic device 411 can be portable and can include (i) communications devices such as mobile telephones, citizen band radios, family radio spectrum radio, and wireless internet devices, (ii) portable computing devices such as notebook computers, personal digital assistants, and calculators, (iii) military electronic devices, such as night visions devices, communications devices, precision GPS, laser targeting devices, data displays, and computing devices, and (iv) other items such as digital cameras, camcorders, global position satellite devices, portable electronic games, flashlights, radios, and audio CD/MP3 players. Alternatively, for example, the combined electronic device 411 can be stationary.

Figure 5A:
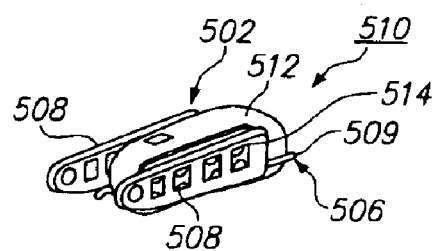
FIG. 5A is a perspective view of still another embodiment of a power source in a portable position, having features of the present invention.

FIG. 5A illustrates another embodiment of power source 510 in a portable position 502. In this embodiment, the power source 510 includes a housing 512, a crank assembly 514 having a pair of pedals 508, and a stand assembly 506 having a plurality of legs 509. In the portable position 502, the pedals 508 and the legs 509 are folded against the housing 512 to reduce the size of the power source 510. The power source 510 can include components similar to the power source 10 illustrated in FIGS. 1A–1D.

Figure 5B:
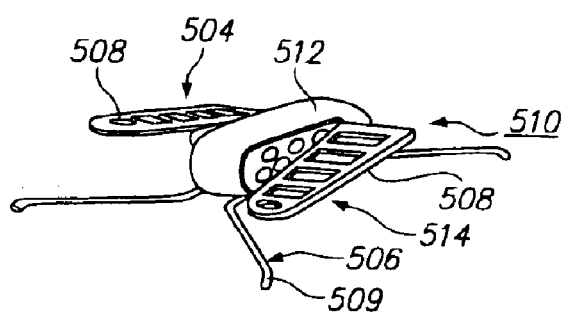
FIG. 5B is a perspective view of the power source of FIG. 5A in a use position, having features of the present invention.

FIG. 5B illustrates the power source of FIG. 5A in a use position 504. In this position, the distal ends of the legs 509 of the stand assembly 506 are rotated away from the housing 512 and support the housing 512 above the ground (not shown). Further, in the use position, the pedals 508 are rotated away from the housing 512. The number of legs 509 can be varied. For example, the stand assembly 506 can include three or four legs 509. Alternatively, the housing 512 could be designed to support the housing 512 in an upright position.

The pedals 508 are adapted to be engaged by the feet of the user. The pedals 508 can go up and down or the pedals 508 can spin. Different methods exist to ensure that unidirectional rotation exists for the dual pedal 508 operated power source 510. In one embodiment, each pedal 508 is adapted so that it pivots on an arm applying unidirectional rotation. A clutch can be used to ensure unidirectional rotation on each pedal 508.

In another embodiment, a rack can be positioned under each pedal 508 that engages a combination of gears and clutches on the arm to ensure unidirectional rotation. And a return spring can forcefully return the pedal to the upper position after it has been pressed fully to the bottom position in preparation for the next power stroke.

In yet another embodiment, the pedals 508 are once again adapted to pivot on arms. In this embodiment, the pedals 508 can be designed so that horizontal pedal surfaces push two cams that are rigidly mounted to the arm. In this embodiment, the pedals operate 180 degrees out of phase due to each cam mounting position. In still another embodiment of a dual pedal operated crank assembly, the pedals can be mounted on the arm or on a second arm with a transmission (chain or idler gears) to cause the rotation of the gear assembly. In this embodiment, the pedals operate similar to a bicycle with no clutches involved in the operation.

In a dual pedal embodiment of this invention, the arm can be designed so that the pivot assembly is substantially centrally located along the length of the arm, and the arm extends away from the pivot assembly in opposite directions. In this embodiment, instead of a handle connected at the distal end of the arm, pedals are connected at either end of the arm so that a force can be generated to rotate the arm about the pivot assembly in a manner similar to the motion of pedaling a bicycle.

In another embodiment of the present invention, the handle 56 (illustrated in FIG. 1B) can be replaced with a pump. In this embodiment, the pump is designed with a cylinder so that vertical down-up strokes on the cylinder drive the arm through the use of a clutch. The pump method operates in a manner similar to that of an upright bicycle pump.

Alternatively, the crank assembly can be designed so that it can operate with the handle or the pedals, i.e. the handle and pedals are interchangeable. In this embodiment, the user can configure the crank assembly in the field by attaching the handle when a minimal size crank assembly is desired. When maximum power is desired, the user can easily remove the handle and replace with the pedals for operation.

Figure 6A:
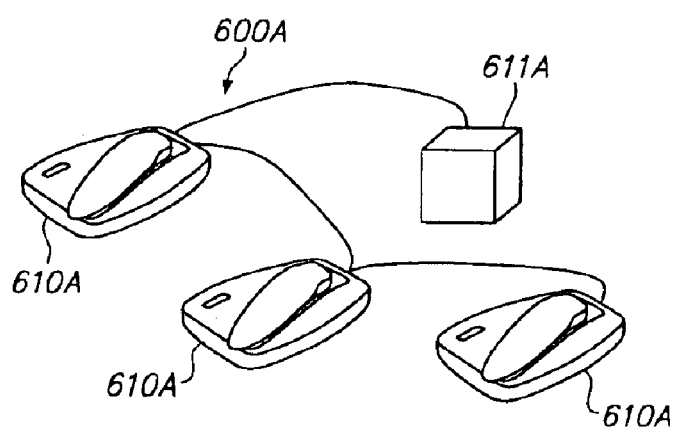
FIG. 6A is a perspective view of first embodiment of a power source combination having features of the present invention.

FIG. 6A is a perspective view of first embodiment of a power source combination 600A and an electronic device 611A having features of the present invention. In this embodiment, the power source combination 600A includes a plurality of power sources 610A that are electrically connected together. In this embodiment, each power source 610A can have features similar to the power source 10 described above and illustrated in FIG. 1A. The number of power sources 610A utilized in the power source combination 600A can be varied. For example, in FIG. 6A, the power source combination 600A includes three power sources 610A. Alternatively, the power source combination 600A can include more than three or less than three power sources 610A.

With this design two or more power sources 610 can cooperate to charge one or more batteries of the electronic device 611. In one embodiment of the power source combination 600, each power sources 610 individually raises its output voltage until current starts to flow. The individual power sources 610 monitor and regulate the current at the approximately constant output voltage (set by load battery chemistry, temperature, and charging conditions) and thereby control how many watts are delivered. One of the purposes of controlling the outputted watts from each power sources 610 is that this influences how much drag is felt by the user who is operating the power sources 610, whether the crank assembly is operated with the handle or the pedals. In this combination, information can be communicated back to each of the cooperating users as to whether the battery is nearing full charge, or is charging too fast. This can be monitored through the use of a data line, thermocouples, or other similar monitoring devices.

In one embodiment of the power source combination 600, each power sources 610 is capable of delivering energy to the battery of the electronic device 611 regardless of its voltage. So it is also possible to hook the outputs of multiple power sources 610 in parallel to combine their energy and thus charge a battery more rapidly. A complication to the power source combination 600 is that a battery charging too rapidly needs to be able to communicate this to the multiple power sources 610 so that they slow down. This can be done via a battery-to-power source 610 messages system as employed with smart batteries, or with a power source 610-to- power source system where a single power source 610 assumes master control over the other slave power sources 610 and commands their power output maximums. Communication between power sources 610 could be accomplished by placing signals over their joined output power lines. The microprocessor in each slave power sources 610 would receive the slow down commands from the master power sources 610 and reduce power output to prevent battery damage the electronic device 611 from overcharge.

Figure 6B:
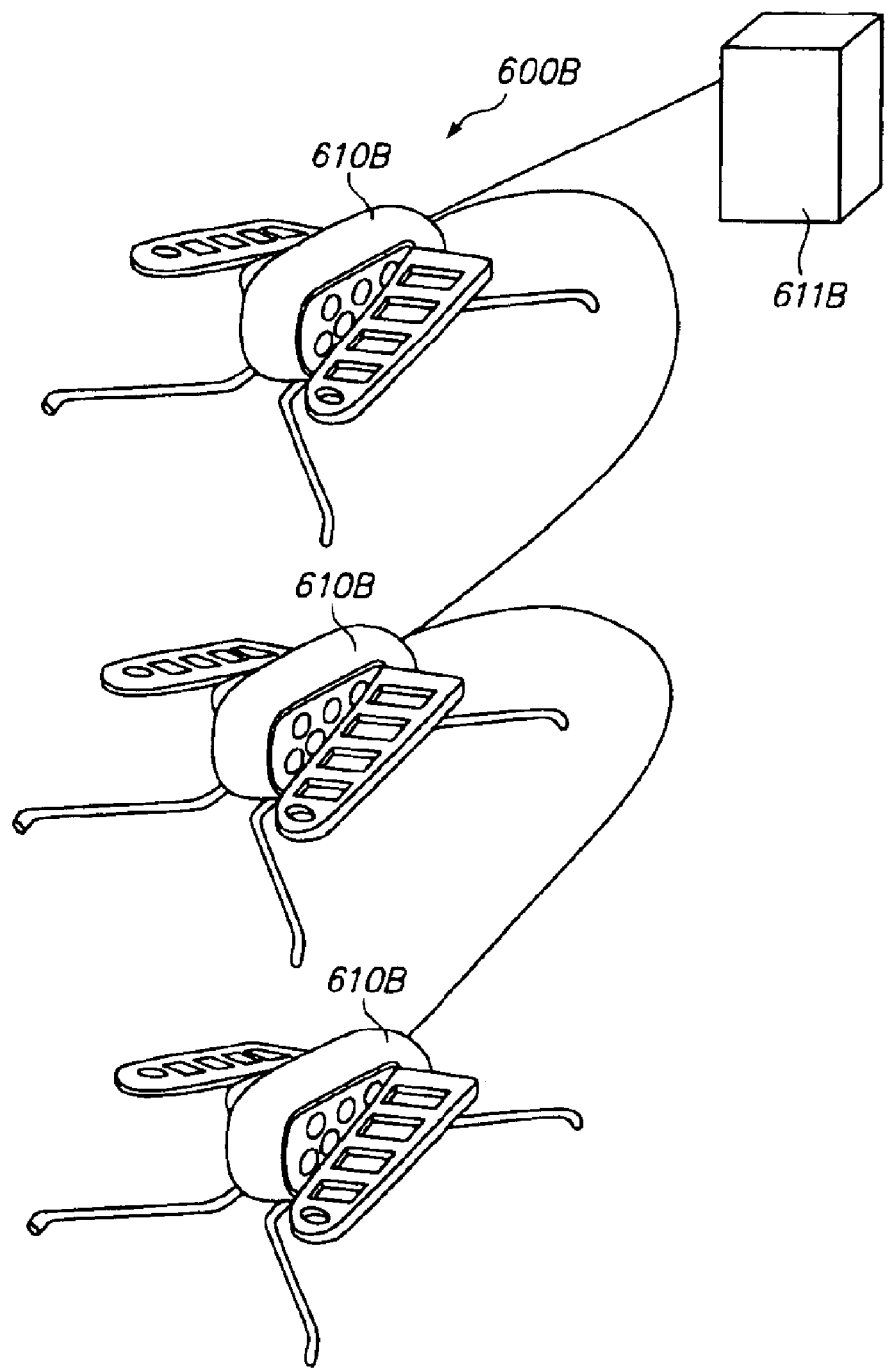
FIG. 6B is a perspective view of second embodiment of a power source combination having features of the present invention.

FIG. 6B is a perspective view of a second embodiment of a power source combination 600B and an electronic device 611B having features of the present invention. In this embodiment, the power source combination 600B includes a plurality of power sources 610B that are electrically connected together. In this embodiment, each power source 610B can have features similar to the power source 510 described above and illustrated in FIGS. 5A and 5B. The number of power sources 610B utilized in the power source combination 600B can be varied. For example, in FIG. 6B, the power source combination 600B includes three power sources 610B. Alternatively, the power source combination 600B can include more than three or less than three power sources 610B.

Figure 6C:
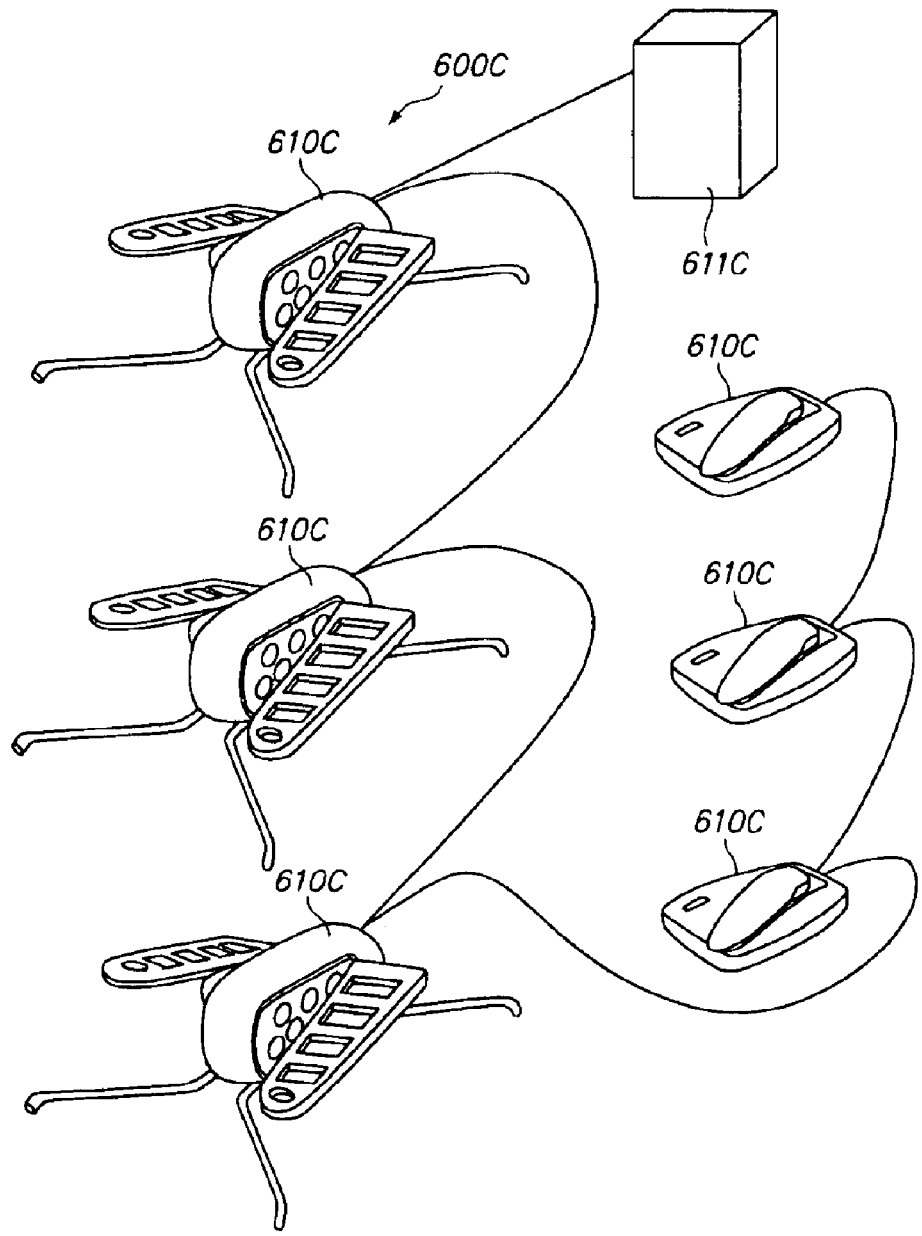
FIG. 6C is a perspective view of third embodiment of a power source combination having features of the present invention.

FIG. 6C is a perspective view of a third embodiment of a power source combination 600C and an electronic device 611C having features of the present invention. In this embodiment, the power source combination 600C includes a plurality of power sources 610C that are electrically connected together. In this embodiment, the power source combination 600C includes three power source 610C having features similar to the power source 10 described above and illustrated in FIG. 1A and three power sources 610C having features similar to the power source 510 described above and illustrated in FIGS. 5A and 5B. The number of power sources 610C utilized in the power source combination 600C can be varied.

While the particular power sources as shown and disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A portable power source that is powered by a user to direct electrical energy to an object, the power source comprising:
   a housing;
   a stator component coupled to the housing;
   a rotor component that is moved relative to the stator component by the user to generate electrical energy; and
   a control system including a plurality of electrical components that receive the electrical energy and electronically adjusts the level of an output electrical energy to the object between multiple, discrete electrical energy levels without changing the electrical components.

2. The power source of claim 1 wherein the control system electronically controls the level of an output current to the object.

3. The power source of claim 1 wherein the control system electronically controls the level of an output voltage to the object.

4. The power source of claim 1 wherein the control system electronically controls the level of an output power to the object.

5. The power source of claim 1 wherein the rotor component rotates relative to the stator component and the control system electronically controls the amount of torque required to rotate the rotor component.

6. The power source of claim 1 wherein the control system electronically controls the amount of force required to move the rotor component relative to the stator component.

7. The power source of claim 1 wherein the control system electronically senses an input voltage required by the object.

8. The power source of claim 1 wherein the control system electronically senses an input power required by the object.

9. The power source of claim 1 further comprising an internal energy storage that stores electrical energy.

10. The power source of claim 9 wherein the control system selectively directs electrical energy to the internal energy storage.

11. The power source of claim 10 wherein the control system selectively bypasses the internal energy storage and directly directs electrical energy to the object.

12. The power source of claim 1 wherein a portion of the electrical energy generated by the initial movement of the rotor component relative to the stator component is diverted to provide power to the control system.

13. The power source of claim 1 further comprising a display that displays a plurality of characters to provide a status of charging of the object.

14. The power source of claim 1 further comprising a display that displays graphics to help the user move the rotor component.

15. The power source of claim 1 further comprising a crank assembly that is coupled to the rotor component so that movement of the crank assembly by the user results in movement of the rotor component.

16. The power source of claim 15 wherein the crank assembly includes a handle that is adapted to be moved by a hand of the user.

17. The power source of claim 15 wherein the crank assembly includes a first pedal and a second pedal.

18. A power source combination including a plurality of power sources of claim 1 electrically connected to the object.

19. A portable power source that is powered by a user to direct electrical energy to an object, the power source comprising:
   a housing;
   a stator component coupled to the housing;
   a rotor component that is moved relative to the stator component by the user to generate electrical energy; and
   a control system that receives the electrical energy, the control system including a processor, a first regulator the controls the level of an output electrical energy to the object, and a second regulator that diverts at least a portion of the electrical energy and regulates the electrical energy to the processor.

20. The power source of claim 19 wherein the control system electronically controls the level of an output current to the object.

21. The power source of claim 19 wherein the control system electronically controls the level of an output voltage to the object.

22. The power source of claim 19 wherein the control system electronically controls the level of an output power to the object.

23. The power source of claim 19 wherein the rotor component rotates relative to the stator component and the control system electronically controls the amount of torque required to rotate the rotor component.

24. The power source of claim 19 wherein the control system electronically controls the amount of force required to move the rotor component relative to the stator component.

25. The power source of claim 19 wherein the control system electronically senses an input voltage required by the object.

26. The power source of claim 19 wherein the control system electronically senses an input power required by the object.

27. The power source of claim 19 further comprising a display that displays a plurality of characters to provide a status of charging of the object.

28. The power source of claim 19 further comprising a display that displays graphics to help the user move the rotor component.

29. The power source of claim 19 further comprising a crank assembly that is coupled to the rotor component so that movement of the crank assembly by the user results in movement of the rotor component.

30. A portable power source that is powered by a user to direct electrical energy to an object, the power source comprising:
   a housing;
   a stator component coupled to the housing;
   a rotor component that is moved relative to the stator component by the user to generate electrical energy; and
   a control system that receives the electrical energy and electronically senses a level of an input electrical energy required by the object.

31. The power source of claim 30 wherein the control system electronically senses a level of an input current required by the object.

32. The power source of claim 30 wherein the control system electronically senses a level of an input voltage required by the object.

33. The power source of claim 30 wherein the control system electronically senses a level of an input power required by the object.

34. The power source of claim 30 wherein the rotor component rotates relative to the stator component and the control system electronically controls the amount of torque required to rotate the rotor component.

35. The power source of claim 30 wherein the control system electronically controls the amount of force required to move the rotor component relative to the stator component.

36. The power source of claim 30 further comprising a crank assembly that is coupled to the rotor component so that movement of the crank assembly by the user results in movement of the rotor component.

37. A portable power source that is powered by a user to direct electrical energy to an object, the power source comprising:
- a housing;
- a stator component coupled to the housing;
- a rotor component that is moved relative to the stator component by the user to generate electrical energy;
- a control system that receives the electrical energy; and
- a display that displays a plurality of characters that provide a status of charging of the object.

38. The power source of claim 37 further comprising a crank assembly that is coupled to the rotor component so that movement of the crank assembly by the user results in movement of the rotor component.

39. A portable power source that is powered by a user to direct electrical energy to an object, the power source comprising:
- a housing;
- a stator component coupled to the housing;
- a rotor component that is moved relative to the stator component by the user to generate electrical energy;
- a control system that receives the electrical energy, and
- a display that displays graphics to help the user move the rotor component.

40. The power source of claim 39 further comprising a crank assembly that is coupled to the rotor component so that movement of the crank assembly by the user results in movement of the rotor component.

41. A portable power source that is powered by a user to direct electrical energy to an object, the power source comprising:
- a housing;
- a stator component coupled to the housing;
- a rotor component that is moved relative to the stator component by the user to generate electrical energy; and
- a control system that receives the electrical energy and electronically adjusts the level of an output electrical energy to the object between multiple, discrete electrical energy levels.

42. The portable power source of claim 41 wherein the control system includes a user input that allows the user to specify a required charging condition.

43. The portable power source of claim 41 wherein the user input allows the user to specify the output electrical energy directed to the object.

44. A portable power source that is powered by a user to direct electrical energy to an object, the power source comprising:
- a housing;
- a stator component coupled to the housing;
- a rotor component that is moved relative to the stator component by the user to generate electrical energy; and
- a control system that receives the electrical energy and directs an output electrical energy to the object, the control system including a user input that allows the user to specify a required charging condition on the object.

45. The portable power source of claim 44 wherein the user input allows the user to specify the level of the output electrical energy directed to the object.

46. The portable power source of claim 44 wherein the user input allows the user to adjust a torque required to rotate the rotor component.

47. The portable power source of claim 44 wherein the user input allows the user to select among several previously defined battery types.

48. The portable power source of claim 44 wherein the user input allows the user to select among several previously defined electronic devices.

* * * * *